(12) United States Patent
Kim et al.

(10) Patent No.: US 10,582,162 B2
(45) Date of Patent: Mar. 3, 2020

(54) IMAGE INFORMATION COLLECTING SYSTEM AND METHOD FOR COLLECTING IMAGE INFORMATION ON MOVING OBJECT

(71) Applicant: SEOUL NATIONAL UNIVERSITY R&DB FOUNDATION, Seoul (KR)

(72) Inventors: Suhwan Kim, Seoul (KR); Sumin Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 83 days.

(21) Appl. No.: 15/575,502

(22) PCT Filed: May 19, 2016

(86) PCT No.: PCT/KR2016/005290
§ 371 (c)(1),
(2) Date: Jan. 4, 2018

(87) PCT Pub. No.: WO2016/186458
PCT Pub. Date: Nov. 24, 2016

(65) Prior Publication Data
US 2018/0152673 A1    May 31, 2018

(30) Foreign Application Priority Data
May 20, 2015  (KR) ........................ 10-2015-0070367

(51) Int. Cl.
*H04N 7/18*    (2006.01)
*H04N 5/232*   (2006.01)
(Continued)

(52) U.S. Cl.
CPC .......... *H04N 7/181* (2013.01); *G01S 5/0027* (2013.01); *G01S 5/0263* (2013.01); *G01S 19/49* (2013.01);
(Continued)

(58) Field of Classification Search
None
See application file for complete search history.

(56) References Cited

U.S. PATENT DOCUMENTS 7,872,593 B1*   1/2011  Rauscher ................. G06T 5/50
                                                     340/933
2008/0303901 A1* 12/2008 Variyath .................. G01S 5/02
                                                     348/143
2010/0208903 A1   8/2010  Heigl

FOREIGN PATENT DOCUMENTS

KR    20090000047 A    1/2009
KR    20120008349 A    1/2012
(Continued)

OTHER PUBLICATIONS

English Translation of International Search Report and Written Opinion in related International Application PCT/KR2016/005290, dated Sep. 20, 2016 (2 pages).

*Primary Examiner* — Christopher Braniff
(74) *Attorney, Agent, or Firm* — Yakov Sidorin; Quarles & Brady LLP

(57) ABSTRACT

An image information collecting system comprises: a position transmitting device for transmitting first position information indicating a position of the image information collecting system itself; a plurality of cameras for collecting image data, storing the image data in a storage medium of the image information collecting system itself, generating data identification including oriented direction information of a camera and time information at a time point at which the image data has been collected, and transmitting the data identification information through a network; and a service server for receiving the first position information and the data identification information, and determining whether a target camera for photographing a current position of the position transmitting device exists among the plurality of (Continued)

cameras, using the data identification information and second position information indicating positions of the plurality of cameras.

15 Claims, 14 Drawing Sheets

(51) Int. Cl.
*H04N 5/247* (2006.01)
*G08B 13/196* (2006.01)
*G08B 25/08* (2006.01)
*G01S 19/49* (2010.01)
*G01S 5/02* (2010.01)
*G01S 5/00* (2006.01)
*G01S 19/13* (2010.01)

(52) U.S. Cl.
CPC ....... *G08B 13/196* (2013.01); *G08B 13/1966* (2013.01); *G08B 13/19656* (2013.01); *G08B 13/19671* (2013.01); *G08B 25/08* (2013.01); *H04N 5/23206* (2013.01); *H04N 5/23296* (2013.01); *H04N 5/247* (2013.01); *G01S 19/13* (2013.01)

(56) References Cited

FOREIGN PATENT DOCUMENTS

| KR | 101126526 B1 | 3/2012 |
| KR | 20120061261 A | 6/2012 |

* cited by examiner

IMAGE INFORMATION COLLECTING SYSTEM AND METHOD FOR COLLECTING IMAGE INFORMATION ON MOVING OBJECT

CROSS-REFERENCE TO RELATED APPLICATIONS

This application represents the U.S. National Stage of International Application No. PCT/KR2016/005290, filed on May 19, 2016, and which claims priority to Korean Patent Application No. 10-2015-0070367, filed on May 20, 2015, the disclosures of which are incorporated by reference herein in their entirety.

TECHNICAL FIELD

The following description relates to a system and method for collecting image information on a specific object.

BACKGROUND ART

Closed-circuit television (CCTV) is used to prevent crimes and obtain evidential data on crimes. In addition to CCTV which is fixed, various devices for acquiring images are being introduced. For example, there are vehicle black boxes, portable devices with a built-in camera, wearable devices such as Google Glass, and the like.

DISCLOSURE

Technical Problem

Generally, a person who is a subject of a recording camera cannot detect the presence of the camera. Therefore, surveillance systems have a privacy infringement problem.

The following description is directed to providing an image information collection system in which a server of a surveillance system determines, using location information received from a location transmitting device carried by a subject and image identification information received from a camera, only whether the subject at a specific location is being recorded. When a camera records the subject, the server receives an image from the camera only when necessary. Normally, however, only cameras will possess images of the subject.

Technical Solution

In one general aspect, there is provided an image information collection system including: a location transmission device configured to transmit first location information indicating a location thereof; a plurality of cameras configured to collect and store image data in storage media thereof, generate data identification information including time information of a time point at which the image data was collected and orientation information thereof, and transmit the data identification information via a network; and a service server configured to receive the first location information and the data identification information and determine whether there is a target camera recording a current location of the location transmitting device among the plurality of cameras using the data identification information and second location information indicating locations of the plurality of cameras.

In another general aspect, there is provided an image information collection system including: a location transmitting device configured to transmit first location information indicating a location thereof; a plurality of cameras configured to collect and store image data in storage media thereof and transmit data identification information including time information of a time point at which the image data was collected, orientation information thereof, and second location information indicating locations thereof via a network; and a service server configured to receive the first location information and the data identification information and determine whether there is a target camera recording a current location of the location transmitting device among the plurality of cameras using the data identification information.

In yet another general aspect, there is provided an image information collection system including: a location transmitting device configured to transmit first location information indicating a location thereof; a plurality of cameras configured to collect image data, generate data identification information including time information of a time point at which the image data was collected and orientation information thereof, and transmit the image data and the data identification information via a network; a management server configured to store the image data and the data identification information; and a service server configured to receive the first location information and determine whether there is target image data acquired by photographing a current location of the location transmitting device in the image data stored in the management server using the data identification information stored in the management server and second location information indicating locations of the plurality of cameras.

In yet another general aspect, there is provided an image information collection system including: a location transmitting device configured to transmit first location information indicating a location thereof; a plurality of cameras configured to collect and store image data in storage media thereof, generate data identification information including time information of a time point at which the image data was collected and orientation information thereof, and transmit the data identification information via a network; a management server configured to store the data identification information; and a service server configured to receive the first location information and determine whether there is a target camera recording a current location of the location transmitting device among the plurality of cameras using the data identification information stored in the management server and second location information indicating locations of the plurality of cameras.

Advantageous Effects

According to technology described below, a server only has information about whether a subject is being recorded and receives image data from a camera only when necessary. Therefore, the technology described below minimizes infringement of privacy. Also, according to the technology described below, images are transmitted only when necessary, and thus network traffic is reduced.

MODES OF THE INVENTION

Figure 1:
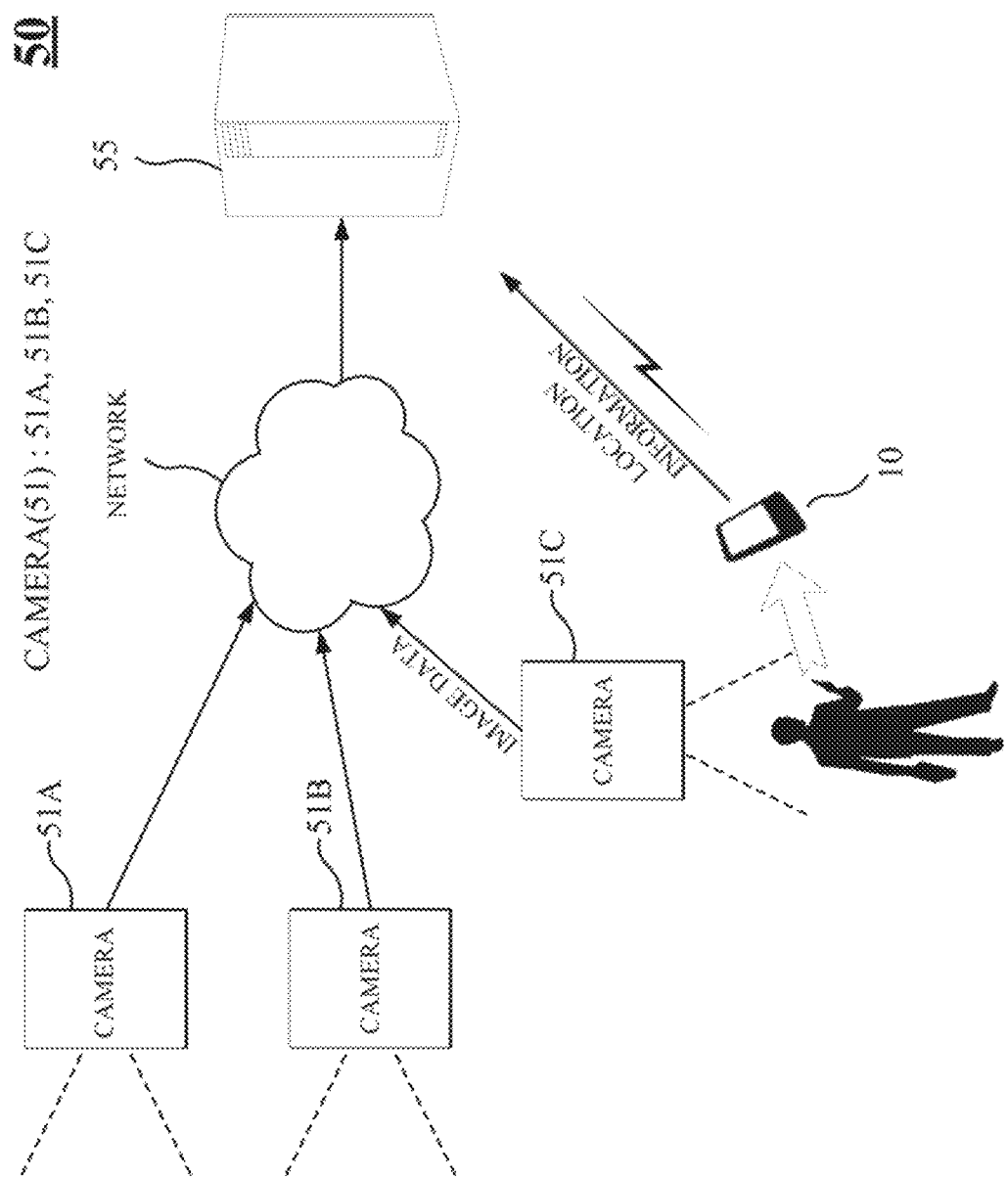
FIG. 1 illustrates an example of a block diagram of a conventional surveillance system.

The technology described below may be modified in a variety of ways and may have various exemplary embodiments, and specific exemplary embodiments thereof will be shown as examples in the drawings and described in detail. However, it should be noted that the technology described below is not limited to the specific exemplary embodiments, but includes all possible modifications, equivalents, and replacements which fall within the spirit and scope of the technology described below.

Terms such as first, second, A, B, and the like may be used to describe various components, but the components are not limited by the terms. The terms are used only to distinguish one component from other components. For example, a first component may be named a second component, and a second component may be named a first component in a similar way without departing from the scope of the technology described below. The term "and/or" includes a combination or any of a plurality of listed relevant items.

Among the terms used in this specification, a singular expression includes a plural expression unless clearly stated otherwise in the context. Terms such as "including" and the like are used only to designate the features, numbers, steps, operations, components, parts, or combinations thereof described in the specification and do not exclude the presence or addition of one or more other features, numbers, steps, operations, components, parts, or combinations thereof.

Prior to describing the drawings in detail, a division of configuration units in the present specification is only made according to the main function of each of the configuration units. In other words, two or more configuration units, which will be described below, may be combined into a single configuration unit, or one configuration unit may be divided into two or more units according to subdivided functions thereof. Each of the configuration units, which will be described below, may additionally perform some or all functions of other configuration units besides the main function of the configuration unit, and some of main functions taken by each of the configuration units may be exclusively taken and performed by other configuration units. Therefore, the presence of each configuration unit described through the present specification should be functionally interpreted. For this reason, it should be clearly noted that configurations of configuration units of an image information collection system described below may differ from corresponding drawings within the limits of achieving the purpose of the technology described below.

When a method or an operating method is performed, steps of the method may be performed in a different order from the described order unless a specific order is clearly mentioned in the context. In other words, steps may be performed in the same order as described, performed substantially simultaneously, or performed in a reverse order.

First, the terminology used in the following description will be defined.

A camera is a device that collects images. The camera can collect still images or video. Furthermore, the camera can collect data other than images. Using various kinds of sensors, the camera can additionally collect audio data, odor data, vibration data, temperature data, humidity data, illuminance data, wind speed data, wind direction data, and the like.

The camera can generate and store time information of a time point at which image data was collected, location information of a spot at which the image data was collected, and orientation information at the time point at which the data was collected. The location information is information indicating a location of the camera. The orientation information is information on an orientation of the camera acquiring an image. In other words, the orientation information represents an orientation of the image acquired by the camera (based on the center of the image, a specific reference point, or a specific object).

The time information, the location information, and the orientation information generated by the camera while the camera is collecting the image is information for specifying the collected image data. From now, information for specifying image data collected by a camera will be referred to as data identification information. Data identification information is image identification information for specifying an image acquired by a camera.

The camera may generate data identification information from a collected image and also transmit the data identification information via a network. Therefore, the camera may include an image sensor, a circuit for data processing, and a communication device for transmitting and receiving data. For example, the camera may encompass a closed-circuit television (CCTV), a smart phone, a portable device having a built-in image sensor, a black box of a vehicle, a car having a built-in image sensor, a drone having a built-in image sensor, a wearable device having a built-in image sensor, an Internet of things (IoT) sensor device having a built-in image sensor, and the like.

The camera may move or rotate in a predetermined manner. For example, the camera itself may move, or the camera may be disposed in a movable object (a vehicle, a robot, or a person). In this case, data identification information may include a location information, a movement speed, a movement direction, a rotation speed, a rotation direction, and the like. Also, the data identification information may include an identifier (ID) of the camera, an ID of collected image data, and the like.

An event denotes an incident that occurs at a specific time in a specific space or at a specific spot. For example, the event includes a traffic accident, a traffic situation, movement of an object, a situation in a building or a specific zone, status of information being collected by a sensor device from an IoT network, and the like. The event may be defined by elements such as movement of a specific object, occurrence of specific audio, emission of specific light, generation of a signal having a specific frequency, arrival of a signal, and the like.

Event data denotes image data related to an event among pieces of image data collected by the camera. For example, in the case of the camera, image data of a specific object may mainly correspond to event data.

An event request denotes a request for checking an image of a specific object. The event request may be generated by a start command such as a request of a user, a request of a system, occurrence of an accident, movement of a specific object, and the like. A message requesting the event data includes information for specifying the event. Information including the event is referred to as event information. The event information may include information such as a specific time, a specific location, a specific direction, an ID for specifying the event, or the like. The event information is information corresponding to the data identification information generated by the camera.

The event information is fundamentally generated by a device that requests specific data collected by an information collection device or an external device such as a server. In some cases, a device including the camera may transmit the event information to a server.

The data identification information generated by the camera is used to determine whether the collected data is related to a specific event. A system that provides a an event checking service may determine whether a camera has collected event data by comparing event information with the data identification information.

FIG. 1 is an example of a block diagram of a conventional surveillance system 50.

The surveillance system 50 includes a plurality of cameras 51 (51A, 51B, and 51C) and a server 55. The plurality of cameras 51A, 51B, and 51C transfer collected specific data to the server 55 via a wired or wireless network.

For example, in the case of a security system, the cameras 51 corresponding to information collection devices acquire image data and transfer the image data to the server 55 via the wired or wireless network. The cameras 51 may transfer specific data in real time, or may transfer data stored in buffers thereof later.

Assuming that the cameras 51 are disposed over a wide area and transmit image data to the server 55, a large amount of data is stored in the server 55, and the surveillance system 50 runs out of storage space within a short time. In this case, an additional cost is required to expand the storage space. In this case, the conventional surveillance system 50 has limitations in storage space and network resources.

Figure 2:
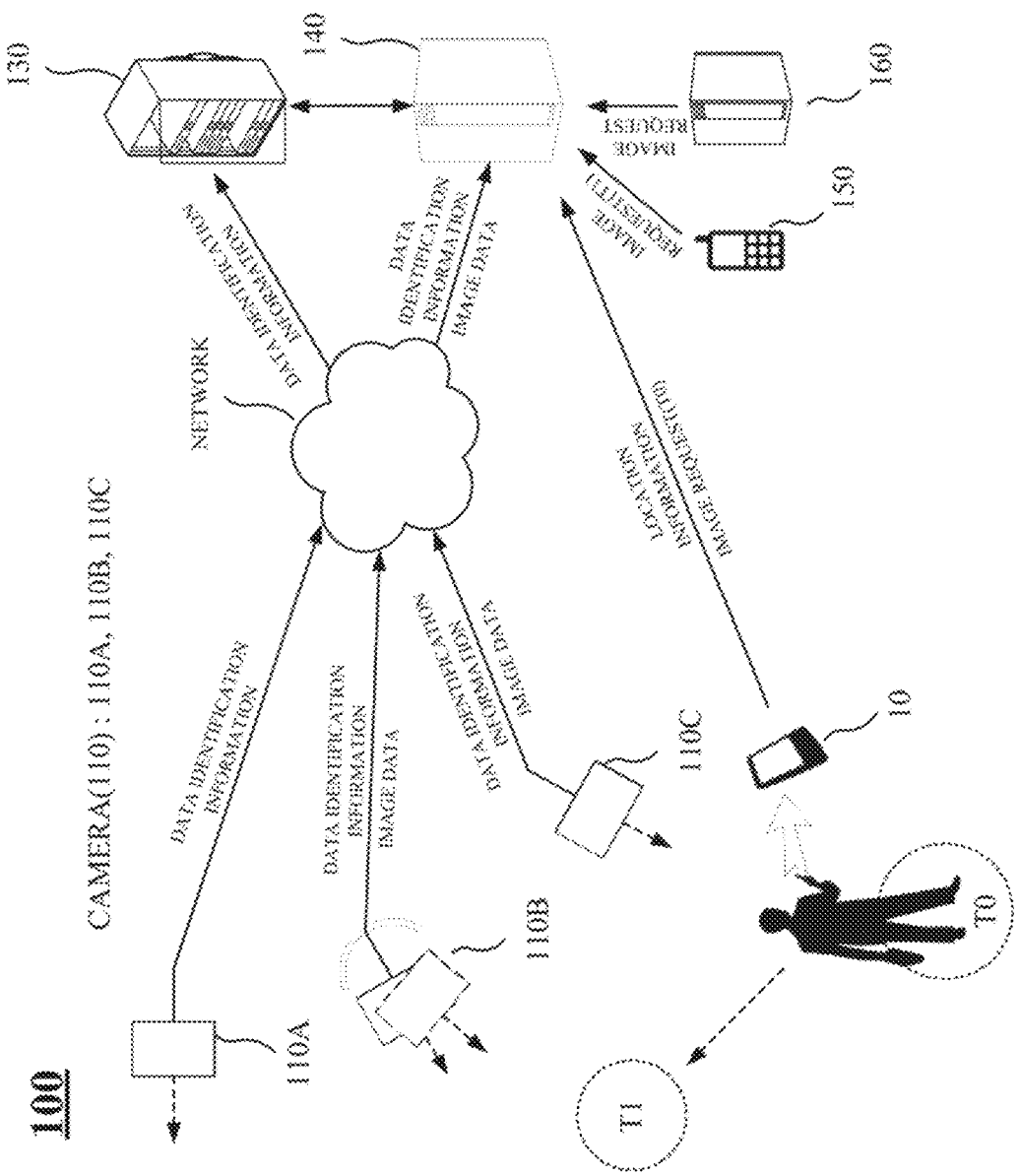
FIG. 2 illustrates an example of a block diagram of an image information collection system.

FIG. 2 is an example of a block diagram of an image information collection system 100.

The image information collection system 100 includes a plurality of cameras 110 (110A, 110B, and 110C) and a service server 140. The cameras 110 collect image data and generate data identification information. The service server 140 stores the data identification information, receives an image data request (an event data request), and collects event data from a camera. In the image information collection system 100, a network may have various forms such as a wired network, a short-range wireless network, a mobile communication network, an ad-hoc network, a vehicle ad-hoc network (VANET), and the like. The network can be any type of network that can transfer predetermined data.

Furthermore, the image information collection system 100 may separately include a management server 130 that stores and manages the image data and the data identification information transmitted by the cameras 110. The management server 130 may serve only as a database that manages data. Although the management server 130 is referred to as a server, the management server 130 may be a device such as a relay that relays data in a network or a gateway.

A location transmitting device 10 carried by a subject of recording denotes a terminal such as a smart phone, a portable device in which a global positioning system (GPS) module is installed, a vehicular navigation device, and the like. The location transmitting device 10 can be any device that can only transmit current location information. In FIG. 2, a portable terminal capable of measuring a location thereof is shown as an example of the location transmitting device 10.

The location transmitting device 10 transmits its own location information to the service server 140 via the network in real time or periodically.

The data identification information collected by the cameras 110 is transferred to the service server 140 via the network. The service server 140 may compare event information and the data identification information and determine whether specific data is related to an event. In other words, the service server 140 may determine whether a camera 110 has collected event data related to a specific event.

As described above, various components in the image information collection system 100 may compare the data identification information and event information and determine whether specific data is event data. However, for convenience of description, it is assumed below that the service server 140 compares the data identification information and event information and determines whether a camera has collected event data.

A user terminal 150, a service requesting server 160, or the location transmitting device 10 carried by a user who is a recording target may request image data of a specific time point (event request). In FIG. 2, the location transmitting device 10 carried by the subject requests an image of time T0, and the user terminal 150 requests an image of time T1.

In the image information collection system 100, each of the cameras 110A, 110B, and 110C stores image data, and the service server 140 has data identification information from each camera. The service server 140 receives location information of the location transmitting device 10, compares the location information with its own data identification information, and determines only whether there is a camera recording a current location of the location transmitting device 10.

Subsequently, only when there is an even request, does the service server 140 receive image data from a target camera. The target camera denotes a camera that has event data.

The target camera is the camera 110C at time T0 and is the camera 110B at time T1.

The service server 140 may determine that no camera is recording the current location of the location transmitting device 10 on the basis of the location information of the location transmitting device 10. In this case, the service server 140 may find a camera nearby the location of the location transmitting device 10 and control the camera to record the location of the location transmitting device 10. The service server 140 may transmit a command to change at least one of a recording direction and a zoom level of the nearby camera to the nearby camera so that the location of the location transmitting device 10 is recorded.

Furthermore, the service server 140 may control operation of the cameras 110 or another device to obtain high quality images. The service server 140 may also receive illuminance information and the like from the cameras 110 and adjust illuminance in the vicinity of the cameras. The service server 140 may control lighting devices of the cameras or control light devices nearby the cameras. Also, at nighttime, the service server 140 may control the cameras 110 so that the cameras 110 capture infrared images. Needless to say, the cameras 110 themselves may analyze illuminance and adjust lighting devices or switch to an infrared mode.

The service server 140 may receive location information of the location transmitting device 10 in real time or periodically and estimate a movement direction or a movement speed of the location transmitting device 10. FIG. 2 shows a case in which the location transmitting device 10 was nearby the camera 110C at time T0 and was estimated to have thereafter moved close to the camera 110B at time T1. In this case, the service server 140 may control the camera 110B at time T1 or in advance so that the location transmitting device 10 may be recorded without losing track of the location transmitting device 10. FIG. 2 shows an example in which a recording direction of the camera 110B is changed. Furthermore, the service server 140 may control the nearby camera 110C and the camera 110B so that the cameras 110C and 110B continuously record the location transmitting device 10. In other words, the service server 140 controls handover so that the subject is always within the service range.

While collecting specific data, the cameras 110 generates orientation information indicating directions in which lenses of the cameras are pointed. The orientation information may include angle-of-view information which corresponds to performance information of the cameras. This is because the angles of view of the cameras determine how wide of an area data can be collected from on the basis of a predetermined direction.

The data identification information generated by the cameras 110 may include information on times at which data was collected, information on locations at which the data was collected, orientation information at a time point at which the data was collected, information on distances from a spot at which a specific event occurred, and the like. The distance information denotes a distance between a specific object and the cameras 110 measured by image analysis or using a distance measurement sensor (an ultrasonic sensor, an infrared sensor, or the like).

Furthermore, the data identification information generated by the cameras 110 may include information on a period the cameras 110 have for retaining data. For example, the service server 140 may determine whether corresponding data is stored in a specific camera at a current time point on the basis of retention period information included in the data identification information. When the current time point has passed a retention period, the service server 140 may determine that the corresponding data is not in a camera which has transmitted a corresponding piece of data identification information.

When the cameras 110 are fixed inside a building and the like, it is unnecessary to transmit location information to the service server 140. The service server 140 may store location information of a specific camera in advance and compare with location information of the location transmitting device.

To specify data collected by the cameras 110, it is preferable to provide time information and orientation information by default. In other words, the data identification information fundamentally includes time information of image data and orientation information of the cameras. Furthermore, the data identification information may include at least one of location information of the cameras, movement speed information, movement direction information, rotation speed information, and rotation direction information.

The cameras 110 fundamentally store specific data collected by themselves in storage media thereof and transfer data identification information generated for the specific data to the service server 140. The cameras 110 may transfer the data identification information to the service server 140 in real time, at predetermined intervals, or sporadically. Furthermore, as described above, the cameras 110 may transmit the data identification information to the management server 130.

Since collected specific data varies over time, the cameras 110 may generate data identification information in real time or at specific intervals over time. Also, the cameras 110 may generate data identification information every time locations, directions, or the like are changed.

Figure 3:
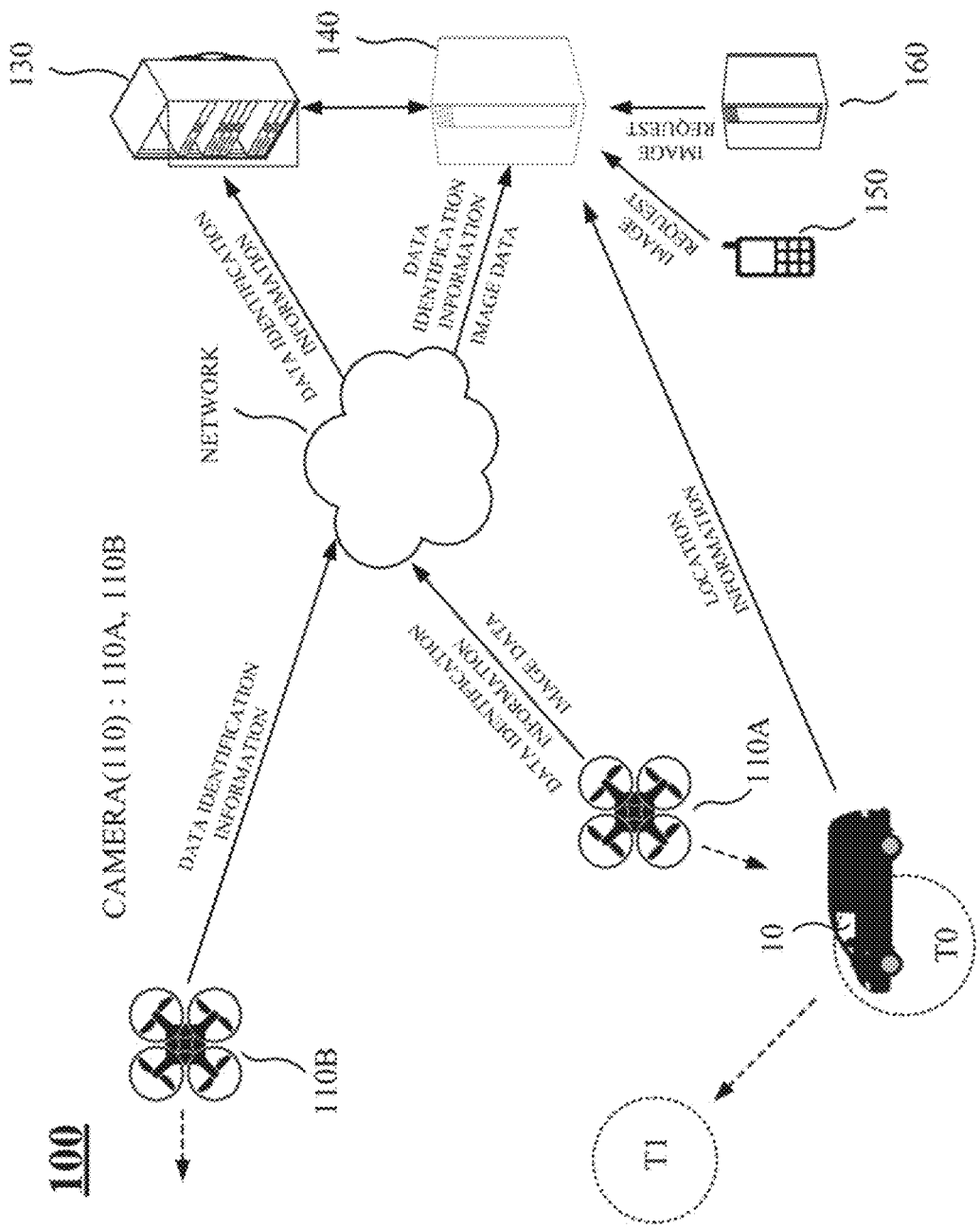
FIG. 3 illustrates another example of a block diagram of an image information collection system.

FIG. 3 is another example of a block diagram of the image information collection system 100. The image information collection system 100 of FIG. 3 differs from the image information collection system 100 of FIG. 2 in that cameras 110 are placed in movable objects. In FIG. 3, drones are shown as an example of the movable objects in which the cameras 110 are placed. Besides flying objects, the movable objects may be apparatuses such as robots, vehicles, and the like. In FIG. 3, the cameras 110 track and record a moving vehicle.

The vehicle includes the location transmitting device 10. The location transmitting device 10, the cameras 110, the service server 140, and the management server 130, and the like operate as described with reference to FIG. 2. In brief, the location transmitting device 10 transmits its own location information to the service server 140, and the cameras 110 store image data and transmit only data identification information to the service server 140. The service server 140 compares the location information transmitted by the location transmitting device 10 and the data identification information transmitted by the cameras 110 and determines whether there is a camera recording the location of the location transmitting device 10 or a specific location related to the location transmitting device 10. In other words, the service server 140 determines whether the location of the location transmitting device 10, a location of a person who carries the location transmitting device 10, a location of an apparatus including the location transmitting device 10, or the vicinity of the location transmitting device 10 is being recorded. Subsequently, when there is an image data request (an event data request), the service server 140 compares event data and the data identification information and collects event data from the cameras 110. Finally, the service server 140 transmits the collected event data to a device that has requested image data. As described above, the management server 130 may store and manage the data identification information.

In FIG. 3, the cameras 110A and 110B are attached to drones, that is, flying objects, and move. Since the cameras 110 are fixed in FIG. 2, it is unnecessary to transmit their location information to the service server 140. This is because, when the service server 140 has location information of each camera in advance, it is possible to determine a location of a camera on the basis of only identification information of the camera.

However, the cameras 110A and 110B moving as shown in FIG. 3 should transmit their current location information to the service server 140. When the cameras 110 are included in movable objects such as a car, a flying object, and a moving robot, the cameras 110 transmit data identification information including their location information. The cameras 110 of the movable objects fundamentally transmit the location information, time information, and orientation information thereof as the data identification information. Also, the cameras 110 may add at least one of movement direction information, movement speed information, distance information, rotation direction information, and rotation speed information to the data identification information.

The movement speed information, the movement direction information, and the like may determine whether data collected by the cameras 110 is related to a specific event. For example, when a camera 110 moving at high speed has collected an image related to a specific accident at a first time T1, the service server 140 may determine that data which is collected by the camera 110 at a second time T2 is not related to the event. Also, the movement speed information or the movement direction information may determine whether data collected after a predetermined time point is related to a specific event. For example, when a camera 110 having a specific movement speed and movement direction was at a first spot at a first time, the service server 140 may determine that the camera 110 collected data at a second spot at which an event occurred a predetermined time thereafter.

Since collected specific data varies over time, the cameras 110 may generate data identification information in real time or at specific periods over time. Also, the cameras 110 may generate data identification information every time locations, directions, or the like are changed. When the cameras 110 move, location information thereof is fundamentally changed, and thus it is preferable to generate data identification information at predetermined intervals or at time intervals corresponding to a movement speed.

The service server 140 may determine that no camera is currently photographing a location of the location transmitting device 10 on the basis of location information of the location transmitting device 10. In this case, the service server 140 may find a camera nearby the location of the location transmitting device 10 and control the camera so that the camera records the location of the location transmitting device 10. Since the cameras 110 are movable objects, it is unnecessary to issue a command for the nearby camera to record a specific target, and a currently available camera 110 may be caused to track and record the specific target.

The service server 140 may transmit a command to change at least one of a location of a camera, a recording direction of a camera, and a zoom level to a camera so that the location of the location transmitting device 10 is recorded. In other words, the service server 140 may control a movable camera so that the movable camera tracks and records a target.

In FIG. 3, at time T0, the camera 110A is recording a vehicle which is a recording target. When the vehicle moves and a location thereof changes at time T1, the service server 140 may transmit a control command to the camera 110A so that the camera 110A continuously tracks and records the vehicle. Also, the service server 140 may transfer a control command to the camera 110B to move to a spot at which the vehicle is expected to arrive at time T1.

Meanwhile, the cameras 110 may also receive location information of the location transmitting device 10. In this case, the cameras 110 may actively track and record the photographic target. For example, the camera 110A may receive location information of the location transmitting device 10 and continuously track and record the vehicle.

Also, when necessary, the camera 110A may request that the service server 140 cause the other camera to continuously record the photographic target. For example, when a zone being recorded by the camera 110A is determined and the photographic target is expected to deviate from the zone, the camera 110A may request the service server 140 to control the other camera 110B. When the camera 110A is required to record another target, the camera 110A may also request that the service server 140 cause the other camera 110B to record the current photographic target. Needless to say, the service server 140 may set a recording target of each of the cameras 110A and 110B.

When the location transmitting device 10 is not exposed to the outside, the cameras 110 cannot directly record the location transmitting device 10. Therefore, to be accurate, the cameras 110 record a spot at which the location transmitting device 10 is present or a specific spot related to the location transmitting device 10. However, for convenience of description, the cameras 110 will be described as photographing the location transmitting device 10.

Various examples of a method of collecting image data will be described below with reference to FIGS. 6 to 9.

Figure 4:
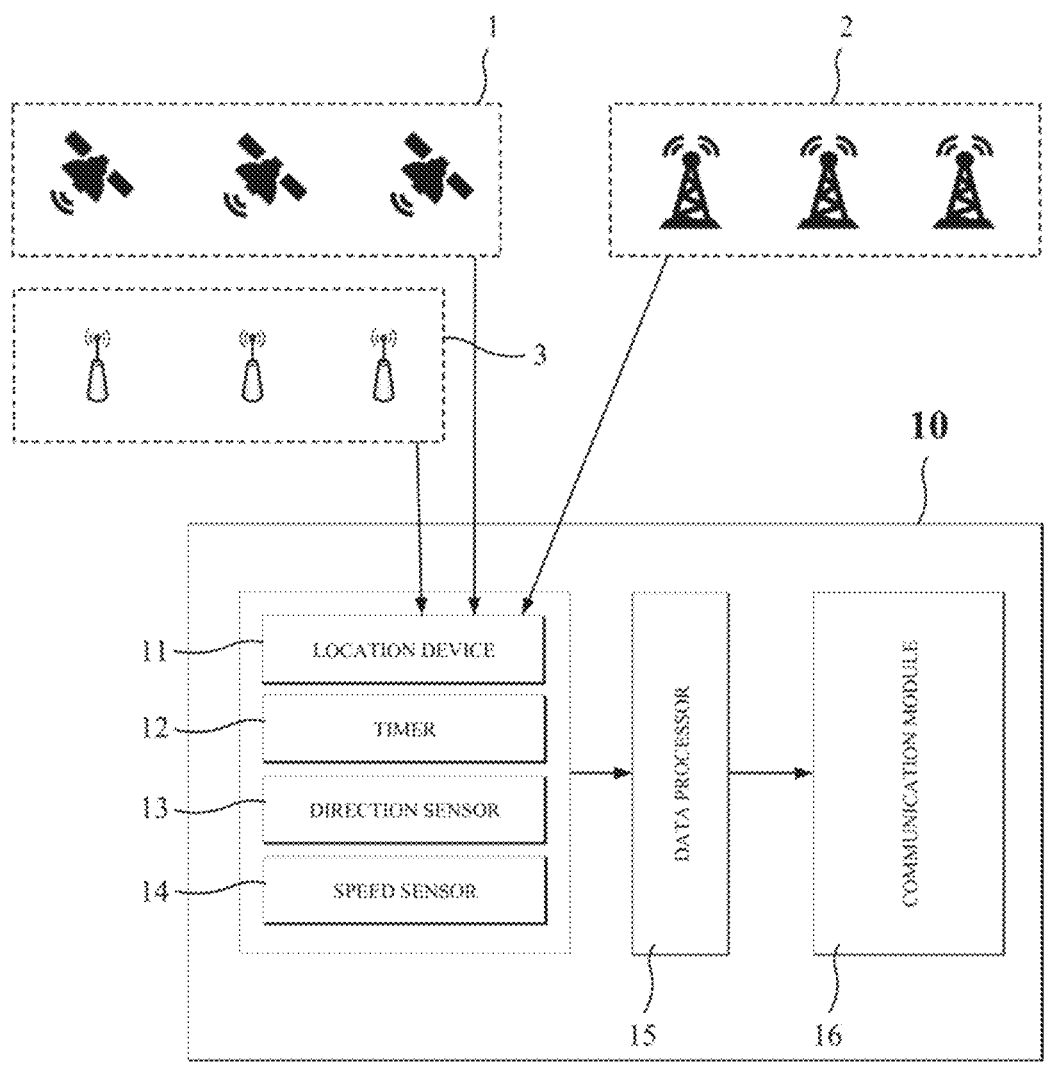
FIG. 4 illustrates an example of a block diagram of a location transmitting device.

FIG. 4 is an example of a block diagram showing a configuration of the location transmitting device 10.

The location transmitting device 10 fundamentally includes a location device 11 for measuring a current location thereof. The location device 11 may be a device that uses various systems. Fundamentally, the location device 11 may measure a geographic location using a satellite system 1. In other words, the location device 11 may be a module for using a satellite navigation system such as a GPS system or a global navigation satellite system (GNSS) system. Description of a locating method in which signals of three or more satellites are used will be omitted. Also, the location device 11 may measure the location using a mobile communication system 2. For example, signals of three or more base stations may be used to measure the location by triangulation, or location information of a terminal managed by the mobile communication system 2 may be received to acquire the location. An indoor location system 3 may also be used to acquire location information indoors. Typical indoor location technique may employ wireless fidelity (WiFi) and the like.

The location transmitting device 10 may include a timer 12 for generating a current time. The location transmitting device 10 is generally carried by a moving object or disposed in a moving object. Therefore, the location transmitting device 10 may additionally measure a movement direction or a movement speed. To this end, the location transmitting device 10 may include a direction sensor 13 for acquiring orientation and movement direction information, a speed sensor 14 for measuring a movement speed, and the like. Various sensors may be used as the direction sensor 13. For example, a magnetic field measurement sensor, a gyroscope, an acceleration sensor, and the like may be used. Alternatively, it is also possible to determine a direction without a direction sensor by analyzing image data. The direction sensor 13 may measure a rotation direction. The speed sensor 14 may measure a movement speed or a rotation speed.

The location transmitting device 10 should transmit the current location measured through the location device 11 to the service server 140. Additionally, the location transmitting device 10 may transmit the current time, the movement speed, the movement direction, and the like.

A data processor 15 is a device for processing data measured by the location device 11 or another sensor in a predetermined manner. The data processor 15 processes the data in a predetermined packet data form according to a communication method or standard. The data processor 15 may add an ID of the location transmitting device 10 together with location information to the same data packet. When a plurality of location transmitting devices 10 are used, the service server 140 may require IDs of the location transmitting devices 10. Depending on a communication method, information given to only a specific device (e.g., a media access control (MAC) address) may be used as an ID.

A communication module 16 transmits the processed data. Different forms of communication module 16 may be used according to a type of network used in the image information collection system 100.

Figure 5:
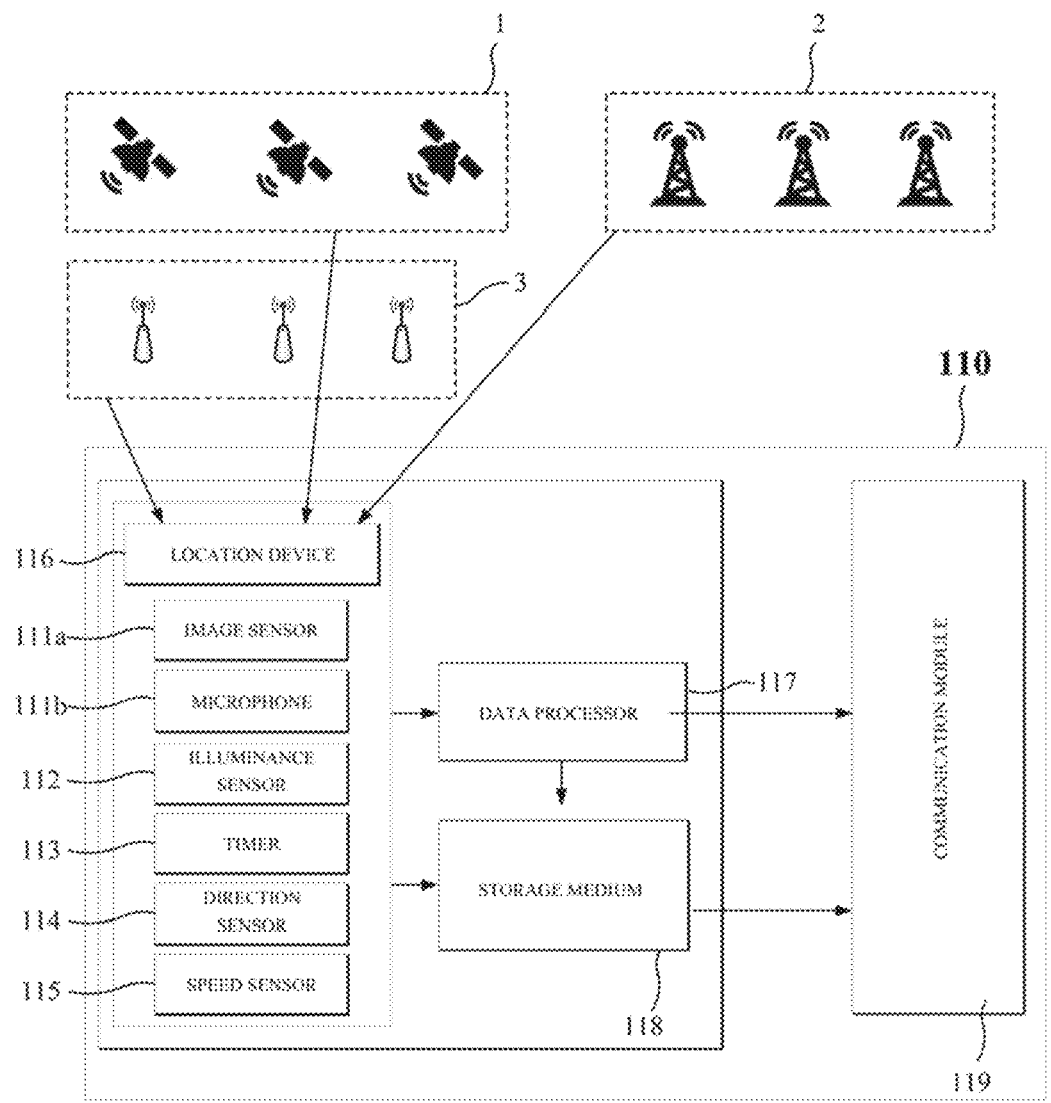
FIG. 5 illustrates an example of a block diagram of a camera.

FIG. 5 is an example of a block diagram showing a configuration of a camera 110.

The camera 110 fundamentally includes an image sensor 111a for collecting image data and a timer 113 for generating time information of a time point at which the image data is collected. Also, when the camera 110 can change a recording direction, the camera 110 may include a direction sensor 114 for acquiring orientation information of the camera. Meanwhile, the camera 110 may acquire an image not through an image sensor in a chipset form but through an optical device.

In addition, the camera 110 may collect data other than image data. For example, the camera 110 may collect audio data through a microphone 111b. Although not shown in FIG. 5, the camera 110 may include an odor sensor for collecting odor data, a temperature sensor for collecting temperature data, a humidity sensor for collecting humidity data, a wind speed sensor for collecting wind speed data, and the like. The image data and additionally collected data are all stored in a storage medium 118. Although not shown in the drawing, the camera 110 may include a distance sensor capable of measuring a distance from a recording target.

An illuminance sensor 112 measures ambient illuminance of the camera 110. The illuminance measured by the illuminance sensor 112 is stored in the storage medium 118 together with other data. Also, the illuminance measured by the illuminance sensor 112 may be included in data identification information and transmitted to the service server 140. As described above, the service server 140 may perform various controls related to camera operation. For example, when the illuminance is low, the service server 140 may cause a lighting device to operate. Alternatively, the service server 140 may control a lighting device installed in a building or a downtown in conjunction with another system.

When the camera 110 moves, location information is acquired by a location device 116. The location device 116 performs the same operation as the location device 11 of FIG. 5. Also, the camera 110 may collect information on a movement direction and a movement speed through the direction sensor 114 and a speed sensor 115.

The data processor 117 is a device for processing data identification information. The data processor 117 processes at least one of time information, location information, orientation information, movement direction information, movement speed information, distance information, rotation direction information, and rotation speed information as data identification information. Also, the data processor 117 may add unique identification information of the camera 110 to the data identification information. Further, the data processor 117 may add identification information of the image data collected by the camera 110 to the data identification information.

The storage medium 118 stores data such as image data and the like, which is collected from a specific target by the camera 110. Here, the storage medium 118 should store an ID of the collected data together with the collected data. Also, the storage medium 118 may store data identification information together with the collected data. When pieces of collected data have IDs and the service server 140 transmits an ID of a specific piece of collected data, the storage medium 118 transmits the piece of data through a communication module 119.

The communication module 119 may transmit data identification information to the service server 140 and may receive a specific message from the service server 140. Also, on request by the service server 140, the communication module 119 may transmit event data to the service server.

Figure 6:
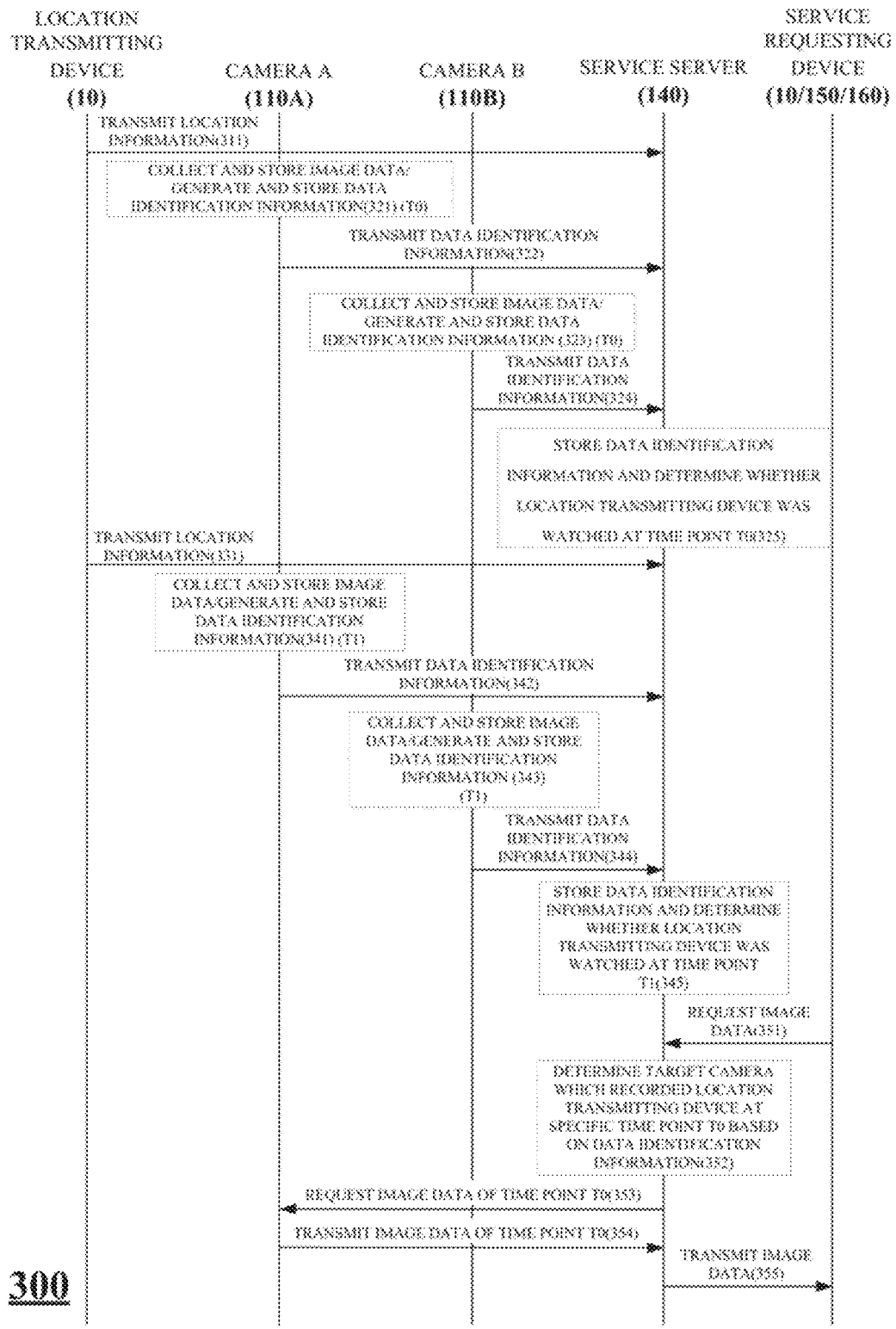
FIG. 6 illustrates an example of an information flow of an image information collection method.

FIG. 6 is an example of an information flow of an image information collection method 300.

The location transmitting device 10 transmits its own location information to the service server 140 (311). At this time, the location transmitting device 10 may also transmit time information, movement speed information, movement direction information, and the like to the service server 140 together with the location information.

Camera A 110A collects and stores image data at time T0 (321). At the same time, camera A 110A generates and stores data identification information of the image data (321). Camera A 110A transfers the generated data identification information to the service server 140 via a wired or wireless network (322).

At time T0, camera B 110B also collects and stores image data and generates and stores data identification information (323). Camera B 110B transfers the generated data identification information to the service server 140 via the wired or wireless network (324).

The cameras 110A and 110B may transmit data identification information to the service server 140 in real time or periodically at the same time as image data is generated. Also, when the cameras 110A and 110B determine that an event has occurred by analyzing collected specific data or using a sensor, the cameras 110A and 110B may transmit data identification information. For example, when a camera is a black box installed in a vehicle, the camera may continuously transmit data identification information at predetermined time intervals, or may analyze image data collected thereby and/or audio data collected by a microphone and transmit data identification information to the service server 140 when it is determined that a vehicle accident and the like has occurred. The camera may sense whether an event such as a vehicle accident has occurred using a vibration sensor or an acceleration sensor. The service server 140 stores the received data identification information (325).

FIG. 6 shows that each of cameras 110A and 110B transmits data identification information to the service server 140 at the same time as data identification information is generated. However, the cameras 110A and 110B may transmit data identification information to the service server 140 at a time point at which the service server 140 requests data identification information.

The location transmitting device 10 transmits location information in real time or periodically regardless of transmission of data identification information by the cameras 110. In other words, there is no temporal order of transmission of location information and transmission of data identification information.

However, based on the data identification information and the location information of the location transmitting device 10, the service server 140 may determine whether there is a camera recording a location of the location transmitting device 10 at time T0. At this time, the service server 140 considers locations of the cameras, recording directions of the cameras, zoom levels of the cameras, and the like on the basis of the location of the location transmitting device 10 and determines whether a specific camera is recording a recording target. In the case of a system employing fixed cameras, it is preferable for the service server 140 to have location information of the cameras in advance. In the case of moving cameras, the service server 140 determines whether a specific camera is recording the recording target in consideration of the locations of the cameras, the recording directions of the cameras, movement speeds of the cameras, movement directions of the cameras, the zoom levels of the cameras, distances from the recording target, and the like.

Subsequently, the location transmitting device 10 transmits location information again (331). This point in time is T1. Camera A 110A collects and stores image data at time T1 (341). At the same time, camera A 110A generates and stores data identification information of the image data (341). Camera A 110A transfers the generated data identification information to the service server 140 via the wired or wireless network (342). At time T1, camera B 110B also collects and stores image data and generates and stores data identification information (343). Camera B 110B transfers the generated data identification information to the service server 140 via the wired or wireless network (344).

The service server 140 stores the data identification information and determines whether there is a camera recording the location of the location transmitting device 10 at time T1 on the basis of the data identification information and the location information of the location transmitting device 10 (345).

It is assumed that camera A 110A has recorded the location of the location transmitting device 10 at time T0 and camera B 110B has recorded the location of the location transmitting device 10 at time T1.

In this way, the service server 140 monitors whether at least one camera is recording (watching) the location transmitting device 10 according to a predetermined period of time.

Subsequently, a service requesting device requests image data (351). The service requesting device is the location transmitting device 10, the user terminal 150, the service requesting server 160, or the like. A user may request image data through the user terminal 150 in an emergency. Although not shown in FIG. 6, the service server 140 may transfer image data of a requested time point to a security agency or a police station. Alternatively, a security agency and the like may request image data of a specific time point from the service server 140 through the service requesting server 160.

An image data request (an event data request) includes specific time point information and an ID of the location transmitting device. Event data identification information included in the image data request (the event data request) is referred to as event information.

The service server 140 compares its own data identification information and information included in the image data request and determines a target camera which recorded the location transmitting device 10 at time T0 (352). The target camera which recorded the location transmitting device 10 at time T0 is camera A 110A. The service server 140 requests image data of time point T0 from camera A 110A (353). The image data request of the service server 140 may include specific time information, ID information of the image data, and the like.

The service server 140 comparatively analyzes the received event information and its own data identification information and determines the target camera which collected event data. The event information fundamentally includes event time information and event location information for specifying an event. The service server 140 compares the event information and its own data identification information and determines a piece of data identification information including time information and location information which are the same as or similar to the event information. Specifically, the service server 140 compares time information included in the data identification information with the event time information and compares location information and orientation information included in the data identification information with the event location information. Also, the service server 140 may use movement direction information, movement speed information, rotation speed information, rotation direction information, distance information, and the like to determine the target camera.

Fundamentally, the service server 140 determines whether event-related data (event data) was acquired at a time which is the same as or similar to a time at which the event has occurred at a location which is the same as or nearby a location at which the event has occurred. When event data has been acquired, the service server 140 may specify camera A 110A as related to the event using the data identification information or camera identification information included in the data identification information.

Camera A 110A may transmit an image captured at the time 0 among pieces of image data stored by itself to the service server 140 on the basis of the time information included in the image data request (354). Alternatively, on the basis of image data ID information included in the image data request, camera A 110A may transmit an image having the corresponding ID among images captured by itself to the service server 140.

There can be a plurality of target cameras which recorded the location transmitting device 10 at time point T0. In this case, the service server 140 may transmit a specific image data request to the plurality of cameras. The service server 140 may receive pieces of image data from the plurality of cameras and reconstruct the pieces of image data transmitted from the plurality of cameras on the basis of time and/or space. The reconstruction of image data will be described in step 681 of FIG. 9 and FIG. 10.

The service server 140 transfers the image data received from camera A 110A to the service requesting device (355).

Although not shown in FIG. 6, camera A 110A, which receives the image data request, determines event data among pieces of specific data stored in a storage medium thereof on the basis of image data identification information which is included in the image data request or has been transmitted together with the image data request. Also, when camera A 110A receives the event information, camera A 110A may compare the event information and its own data identification information and determine event data. In this case, event data is determined twice, once by the service server 140 and once by the camera A 110A.

Camera A 110A may determine whether to accept the event data request. A manager of camera A 110A may set in advance whether to respond to a specific event data request or may determine whether to respond at a time point at which an event request message is received.

Figure 7:
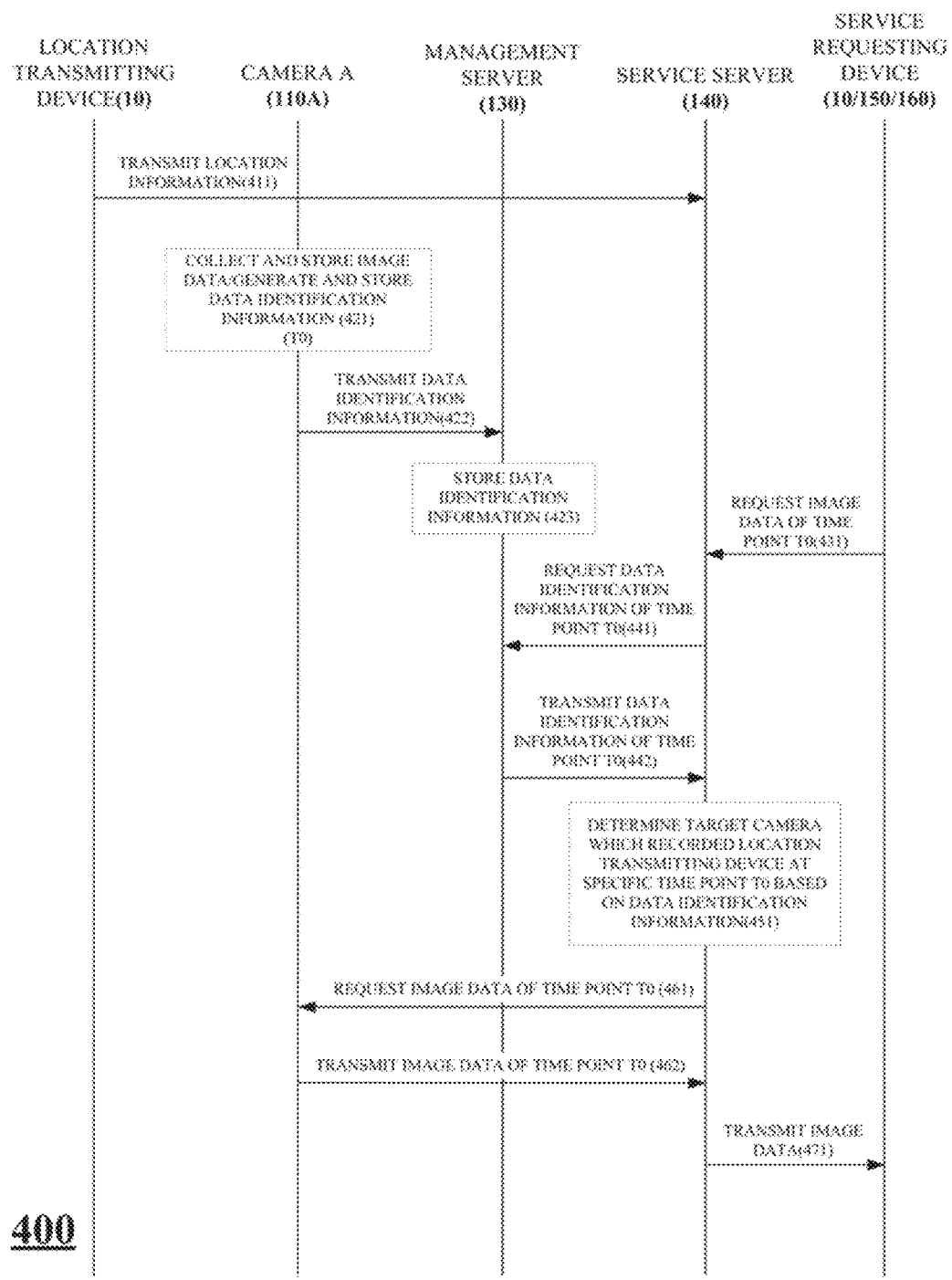
FIG. 7 illustrates another example of an information flow of an image information collection method.

FIG. 7 is another example of an information flow of an image information collection method 400. The image information collection method 400 differs from the image information collection method 300 of FIG. 6 in that the management server 130 stores and manages data identification information.

The location transmitting device 10 transmits its own location information to the service server 140 (411). At this time, the location transmitting device 10 may also transmit time information, movement speed information, movement direction information, and the like to the service server 140 together with the location information.

Camera A 110A collects and stores image data at time T0 (421). At the same time, camera A 110A generates and stores data identification information of the image data (421). Camera A 110A transfers the generated data identification information to the management server 130 via a wired or wireless network (422). It is assumed that camera A 110A is recording the location transmitting device 10 at time point T0.

The management server 130 stores the received data identification information (423).

Subsequently, the service requesting device 10, 150, or 160 transmits an event data request message including event information to the service server 140 (431).

Based on time information in the received event information, the service server 140 requests data identification information from the management server 130 (441). The management server 130 transmits the data identification information of time point T0 to the service server 140 according to information included in the data identification information request (442). Although FIG. 7 shows that the data identification information of time point T0 is transmitted, the management server 130 may transmit only data identification information related to a specific location to the service server 140 on the basis of location information included in the data identification information request. Alternatively, the management server 130 may transmit only data identification information related to a specific location and a specific time to the service server 140. The service server 140 comparatively analyzes the received event information and the data identification information received from the management server 130 and determines a target camera which collected event data (451). The service server 140 transmits an image data request to camera A 110A, which is the target camera (461).

Camera A 110A receiving the image data request determines event data in specific data stored in a storage medium thereof on the basis of event data identification information included in the image data request or received together with the image data request.

Camera A 110A transmits the event data to the service server 140 (462). In FIG. 7, camera A 110A directly transmits the event data to the service server 140 via the network. In some cases, camera A 110A may transfer the event data to the service server 140 through the management server 130. As an example of this case, the management server 130 corresponds to a relay that manages a plurality of cameras or a gateway that controls entry to another network. The management server 130 may be a server that provides a specific service, a database that manages specific data, a relay that manages transfer of specific data, or a gateway device.

Subsequently, the service server 140 transmits the received event data to the service requesting device which has requested event data (471).

Figure 8:
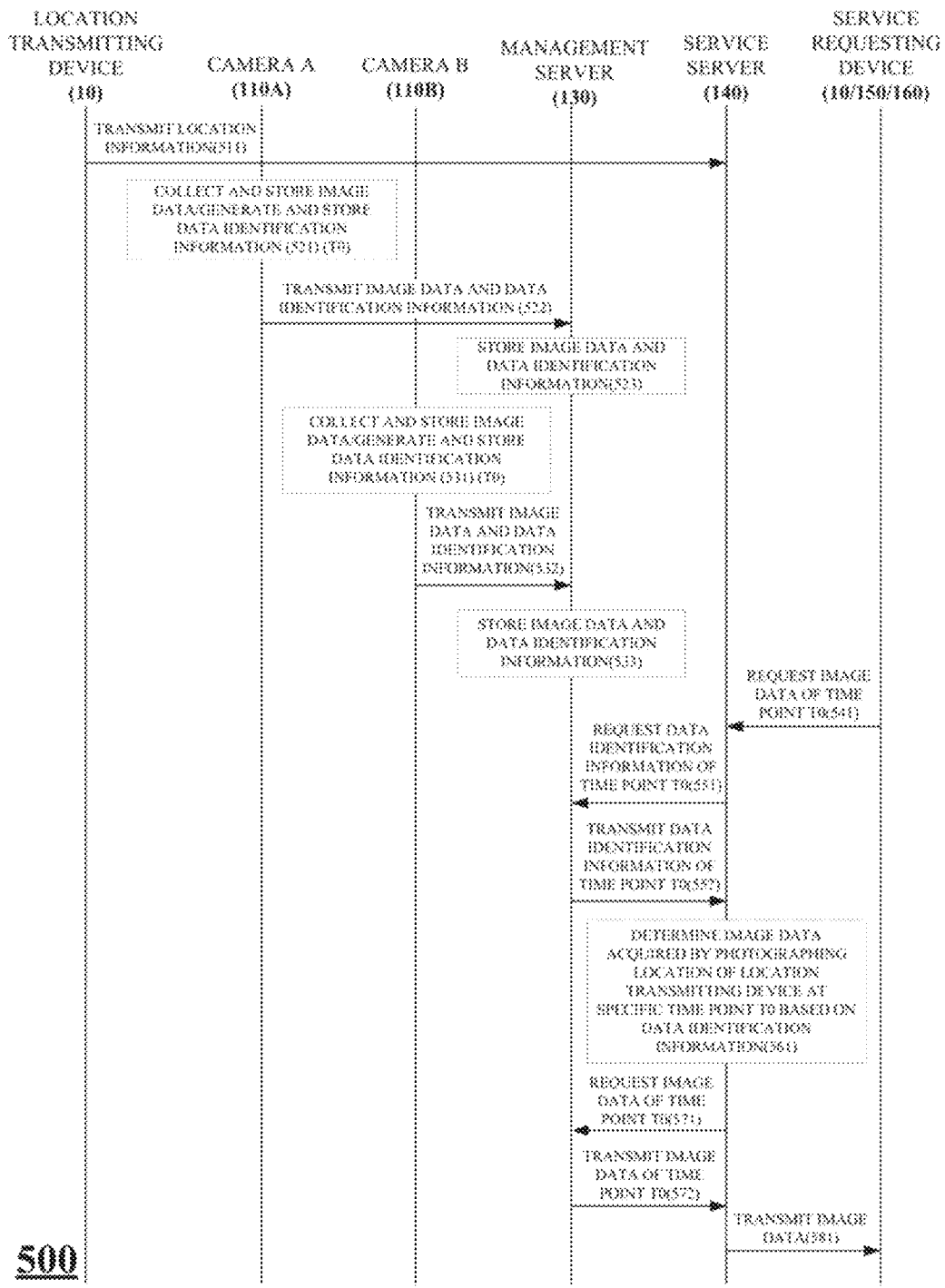
FIG. 8 illustrates another example of an information flow of an image information collection method.

FIG. 8 is another example of an information flow of an image information collection method 500. The image information collection method 500 differs from the image information collection method 400 of FIG. 7 in that a camera transmits image data as well as data identification information to the management server 130.

The location transmitting device 10 transmits its own location information to the service server 140 (511). At this time, the location transmitting device 10 may also transmit time information, movement speed information, movement direction information, and the like to the service server 140 together with the location information.

Camera A 110A collects and stores image data at time T0 (521). At the same time, camera A 110A generates and stores data identification information of the image data (521). Camera A 110A transfers the image data and the data identification information to the management server 130 via a wired or wireless network (522). It is assumed that camera A 110A is recording the location transmitting device 10 at time point T0. The management server 130 stores the image data and the data identification information (523).

At time T0, camera B 110B also collects and stores image data (531). At the same time, camera B 110B generates and stores data identification information of the image data (531). Camera B 110B transfers the image data and the data identification information to the management server 130 via the wired or wireless network (532). The management server 130 stores the image data and the data identification information (533).

Subsequently, the service requesting device 10, 150, or 160 transmits an event data request message including event information to the service server 140 (541).

Based on time information in the received event information, the service server 140 requests data identification information from the management server 130 (551). The management server 130 transmits the data identification information of time point T0 to the service server 140 according to information included in the data identification information request (552). Although FIG. 8 shows that the data identification information of time point T0 is transmitted, the management server 130 may transmit only data identification information related to a specific location to the service server 140 on the basis of location information included in the data identification information request. Alternatively, the management server 130 may transmit only data identification information related to a specific location and a specific time to the service server 140.

The service server 140 comparatively analyzes the received event information and the data identification information received from the management server 130 and determines image data acquired by recording a location of the location transmitting device 10 at time point T0 (561). The service server 140 compares the event information and the data identification information and determines data identification information corresponding to the event information. The service server 140 transmits image data having the data identification information corresponding to the event information.

The service server 140 transmits an image data request to the management server 130 (571). The service server 140 transmits information such as an ID of image data and the like. The management server 130 transmits the image data of time point T0 requested by the service server 140 to the service server 140 (572).

Subsequently, the service server 140 transmits the received image data (event data) of time point T0 as event data to the service requesting device which has requested event data (581).

Figure 9:
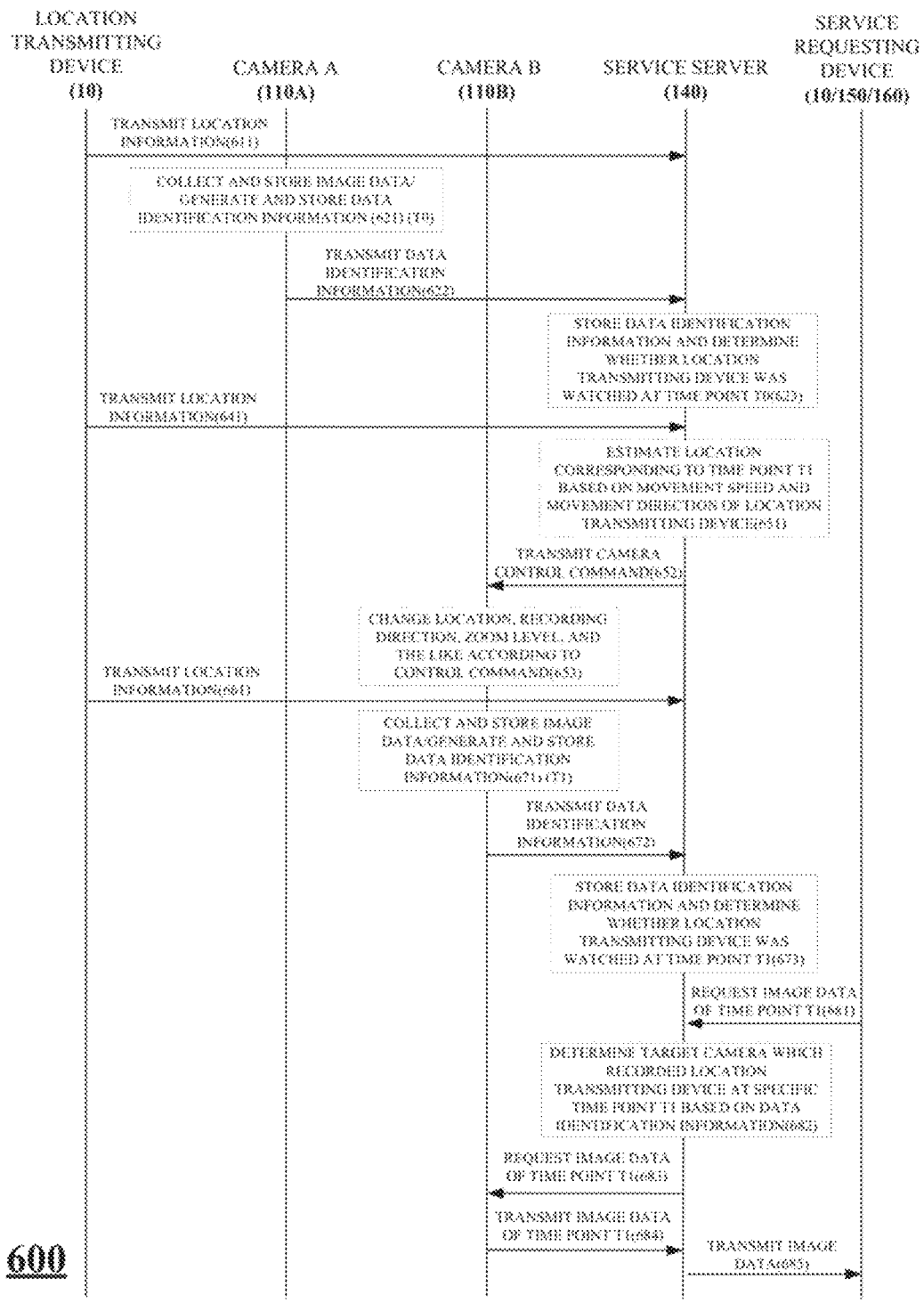
FIG. 9 illustrates another example of an information flow of an image information collection method.

FIG. 9 is another example of an information flow of an image information collection method 600. FIG. 9 relates to an example in which the service server 140 controls the cameras 110 to track the location transmitting device 10 that is a photographic target.

The location transmitting device 10 transmits its own location information to the service server 140 (611). At this time, the location transmitting device 10 may also transmit time information, movement speed information, movement direction information, and the like to the service server 140 together with the location information.

Camera A 110A collects and stores image data at time T0 (621). At the same time, camera A 110A generates and stores data identification information of the image data (621). Camera A 110A transfers the generated data identification information to the service server 140 via a wired or wireless network (622). It is assumed that camera A 110A is recording the location transmitting device 10 at time point T0.

The service server 140 stores the received data identification information (623). The service server 140 may determine whether there is a camera recording a location of the location transmitting device 10 on the basis of the data identification information and the location information of the location transmitting device 10 (623).

The location transmitting device 10 transmits location information to the service server 140 again (641). The location transmitting device 10 may transmit location information in real time. Alternatively, the location transmitting device 10 may transmit location information at predetermined time intervals or sporadically.

The service server 140 may estimate a location of the location transmitting device 10 corresponding to a predetermined time point thereafter on the basis of the movement speed and the movement direction of the location transmitting device 10 (651). When the location transmitting device 10 transmits location information at the predetermined time intervals, the service server 140 may estimate a movement speed or a movement direction of the location transmitting device 10. Also, based on a time at which location information is received, the service server 140 may estimate a movement speed or a movement direction of the location transmitting device 10.

It is assumed that camera A 110A cannot record the location transmitting device 10 at time point T1 but camera B 110B is nearby the estimated location of the location transmitting device 10 at time point T1. Also, it is assumed that camera B 110B cannot appropriately record the estimated location of time point T1 at present.

The service server 140 transmits a camera control command to change at least one of photographic conditions, such as a location of a camera, a recording direction of a camera, a zoom level, and the like, to camera B 110B (652). Camera B 110B changes a recording direction thereof, a zoom level, and the like according to the camera control command (653). The camera control command may include a command to turn on or off a camera and a command to switch to a night mode for a camera having an infrared sensor.

Meanwhile, the cameras 110 may transmit information related camera performance as well as data identification information to the service server 140. The camera performance information may include information about whether the cameras are operating, information about whether the cameras are malfunctioning, file format information of images, color information of image data, information about whether an infrared sensor is operating, and the like. The service server 140 may additionally use the camera performance information to determine a target camera capable of appropriately recording the location transmitting device 10 which is a recording target.

Subsequently, the location transmitting device 10 may transmit location information to the service server 140 again (661). When the location of the location transmitting device 10 changes, the location transmitting device 10 may transmit location information to the service server 140. Camera B 110B collects and stores image data at time point T1 and also generates and stores data identification information (671). Camera B 110B transmits the data identification information to the service server 140 (672). The service server 140 stores the data identification information transmitted by camera B 110B and determines whether the location transmitting device 10 was watched at time point T1 (673).

Subsequently, a service requesting device requests image data of time point T1 from the service server 140 (681). The service server 140 compares event information included in the image data request and its own data identification information and determines a target camera which recorded the location transmitting device 10 at time point T1 (682). The service server 140 transmits the image data request to camera B 110B which is the target camera (683). Camera B 110B transmits the image data of time point T1 which is event data to the service server 140 (684). Finally, the service server 140 transmits the image data of time point T1 to the service requesting device (685).

Figure 10:
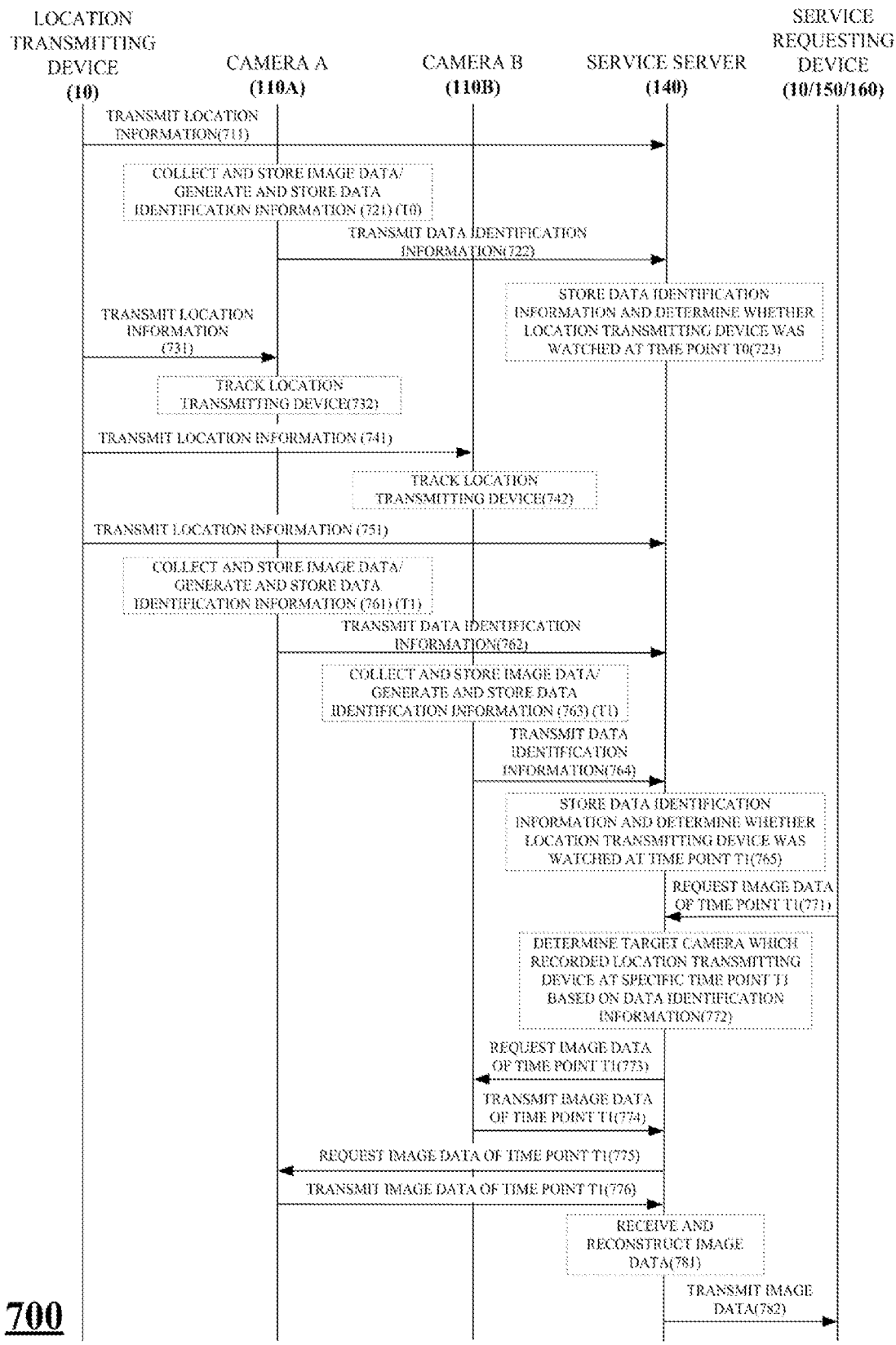
FIG. 10 illustrates another example of an information flow of an image information collection method.

FIG. 10 is another example of an information flow of an image information collection method 700. FIG. 10 relates to an example in which the cameras 110 receive location information of the location transmitting device 10 and track a photographic target.

The location transmitting device 10 transmits location information to the service server 140 (711).

Camera A 110A collects and stores image data at time T0 (721). At the same time, camera A 110A generates and stores data identification information of the image data (721). Camera A 110A transfers the generated data identification information to the service server 140 via a wired or wireless network (722). The service server 140 may store the data identification information and determine whether there is a camera recording a location of the location transmitting device 10 at time T0 on the basis of the data identification information and the location information of the location transmitting device 10 (723).

The cameras 110 may also receive the location information transmitted by the location transmitting device 10. In FIG. 9, the location information received by the service server 140, camera A 110A, and camera B 110B is shown in separate flows. The location information is transmitted once by the location transmitting device 10 and is received by the service server 140, camera A 110A, and camera B 110B all at the time.

When the location transmitting device 10 transmits the location information 731, camera A 110A tracks the location transmitting device 10 on the basis of the received location information (732). Camera A 110A in a fixed form changes in orientation, rotation speed, rotation direction, zoom level, or the like thereof, and camera A 110A placed in a movable object changes in movement location, movement direction, movement speed, rotation speed, rotation direction, zoom level, or the like. Tracking is to continuously record a recording target without losing the recording target. Camera A 110A is recording the location transmitting device 10 at time T0.

When the location transmitting device 10 transmits the location information (741), camera B 110B also tracks the location transmitting device 10 on the basis of the received location information (742).

The location transmitting device 10 transmits the location information to the service server 140 (751).

Camera A 110A collects and stores image data at time T1 (761). At the same time, camera A 110A generates and stores data identification information of the image data (761). Camera A 110A transfers the generated data identification information to the service server 140 via the wired or wireless network (762). At time T1, camera B 110B also collects and stores image data and generates and stores data identification information (763). Camera B 110B transfers the generated data identification information to the service server 140 via the wired or wireless network (764).

The service server 140 may determine whether there is a camera recording the location of the location transmitting device 10 at time T1 on the basis of the data identification information and the location information of the location transmitting device 10 (765).

Camera A 110A has recorded the location transmitting device 10 since time point T0 and also records the location of the location transmitting device 10 at time T1 while tracking the location transmitting device. Camera B 110B records the location of the location transmitting device 10 only at time T1 while tracking the location transmitting device.

A service requesting device requests image data of time point T1 (771). The service server 140 determines a target camera which recorded the location transmitting device 10 at time point T1 on the basis of event information included in the image data request and the data identification information (772).

The service server 140 requests image data of time point T1 from both camera A 110A which is the target camera and camera B 110B. The service server 140 requests the image data of time point T1 from camera B 110B (773), and camera B 110B transmits the image data of time point T1 which is event data to the service server 140 (774). Also, the service server 140 requests the image data of time point T1 from camera A 110A (775), and camera A 110A transmits the image data of time point T1 which is the event data to the service server 140 (776).

The service server 140 may receive the image data from the plurality of cameras and transmit the received data as is to the service requesting device.

In some cases, the service server 250 may process or reconstruct the received event data in a predetermined manner (781). In particular, when event data is received from the plurality of cameras 110, the service server 140 may spatially reconstruct the event data on the basis of a location at which an event occurred or may reconstruct the event data according to a time period of the event. The reconstruction of event data will be described below with reference to FIG. 11. Subsequently, the service server 140 may transmit the reconstructed event data to the service requesting device which has requested the event data (782). Step 781 is not a necessary step and is an optional step.

Figure 11:
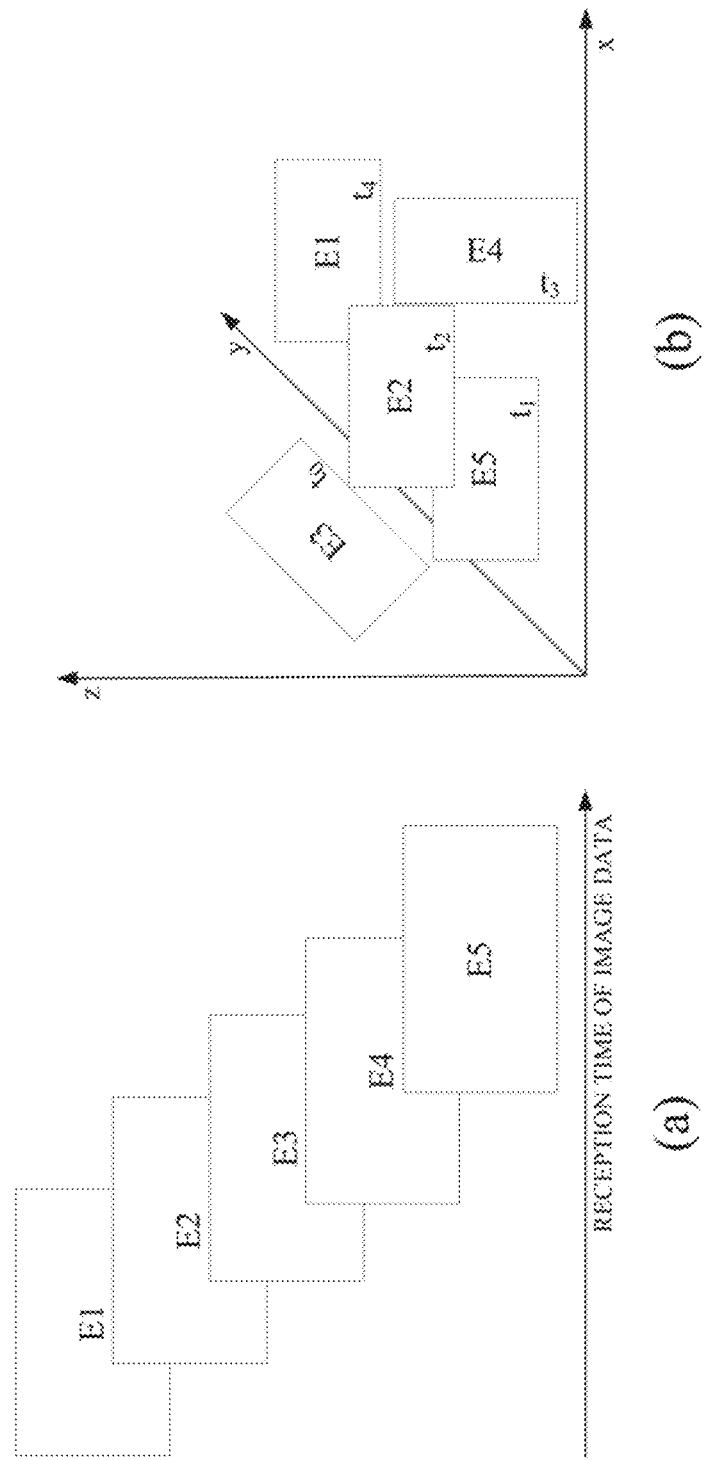
FIG. 11 illustrates an example reconstructing image data collected by a server.

FIG. 11 shows an example of reconstructing image data collected by a server.

It was described above that the service server 140 can reconstruct event data received from the cameras 110. FIG. 11(A) shows an example in which pieces of event data are received from one or more cameras 110. Five pieces of event data E1, E2, E3, E4, and E5 are sequentially transmitted to the service server 140 in order of reception time.

The service server 140 fundamentally has data identification information corresponding to event data which has already been transmitted. It is preferable for the cameras 110 to transmit the event data with related data identification information. The data identification information includes time information, location information, orientation information, and the like of the event data.

Fundamentally, the service server 140 may align the five pieces of received event data on a time axis. In other words, the service server 140 may reconstruct the pieces of event data based on time. FIG. 11(B) shows a case in which the pieces of event data are reconstructed in chronological order of occurrence ($t_0$->$t_1$->$t_2$->$t_3$->$t_4$) and not in order of reception.

Also, the service server 140 may reconstruct the pieces of event data on a spatial axis according to locations and/or directions of the pieces of event data. FIG. 11(B) shows an example in which the pieces of event data are reconstructed in a three dimensional xyz space.

The service server 140 may reconstruct the event data on the time axis and/or the spatial axis. For example, when the event data is image data, pieces of the image data are arranged based on time and re-encoded on the basis of a specific time point such that a three dimensional image may be generated. Alternatively, the service server 140 may simply and sequentially arrange images in a predetermined direction. When the event data is audio data, spatial signal processing may be performed so that a plurality of sounds are heard like audio actually heard at one spot.

Figure 12:
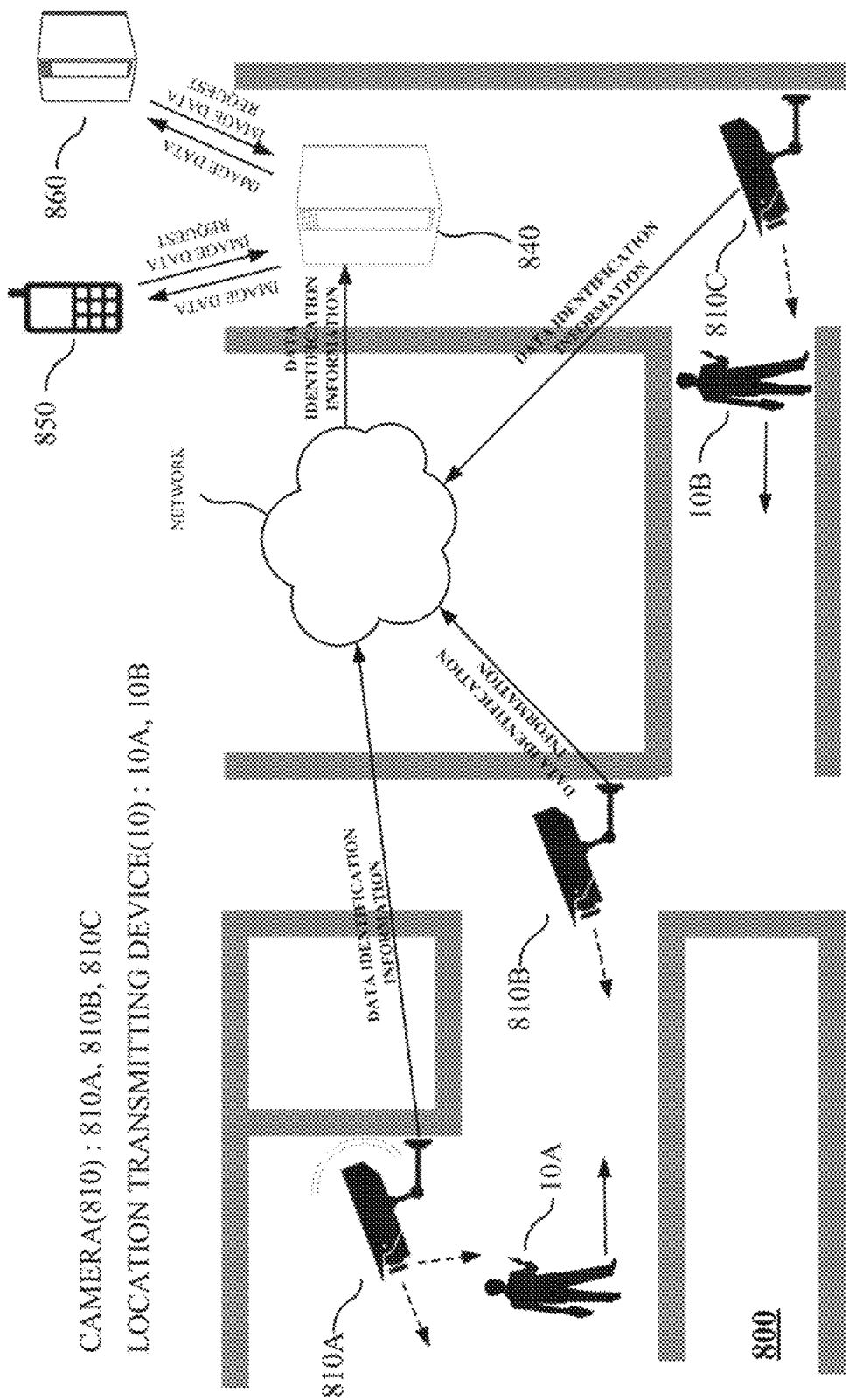
FIG. 12 illustrates an example of a block diagram of a security system which collects image information.

FIG. 12 is an example of a block diagram of a security system 800 which collects image information.

The security system 800 collecting image information exemplifies a surveillance camera system installed in a building or on a street.

The security system 800 collecting image information includes a plurality of cameras 810 (810A, 810B, and 810C) and a service server 840.

A configuration of the cameras 810 may be the same as described with reference to FIG. 5. The cameras 810 collect and store image data in storage media, generate data identification information including time information, location information, and orientation information related to the image data, and transmit the data identification information via a wired or wireless network.

The service server 840 stores the data identification information transmitted by the plurality of cameras 810 and receives event data from the plurality of cameras 810 using received event information.

The orientation information transmitted by the cameras 810 may include information such as rotation directions, rotation speeds, or the like of the cameras. Also, the cameras 810 may additionally transmit information on distances from an object whose movement is detected using distance measurement sensors. In this case, the data identification information includes the distance information, the time information, the location information, and the orientation information.

The cameras 810 may generate the orientation information which indicates view directions of the cameras using at least one of gyro sensors, acceleration sensors, and magnetism sensors. Needless to say, the cameras 810 may generate the time information by using timers or receiving time information via the wired or wireless network, and may generate the location information by using location devices in some cases. For example, when the cameras 810 are installed in movable objects, location information should be generated. However, in the case of cameras whose locations or orientations are fixed, the location information or the orientation information of each of the cameras may be pre-stored and managed in the service server 840. Therefore, location information or orientation information may not be additionally required. The location information and the orientation information of the cameras are used to specify a camera related to an event.

Although FIG. 12 shows fixed cameras, when the cameras are installed in movable objects, the data identification information may further include at least one of movement speed information of the movable objects and movement direction information of the movable objects. In this case, the service server 840 may further use the movement speed information or the movement direction information to specify a camera related to the event.

Also, the cameras 810 may generate data identification information further including at least one of angle-of-view information thereof, performance information thereof, camera setting information of times at which the image data was collected, and illuminance information of the times at which the image data was collected. The camera setting information denotes information, such as international organization for standardization (ISO) values, shutter speeds, and the like. The illuminance information, the camera performance information, the camera setting information, or the like may be used to determine whether high quality image data (which makes it possible to identify a state of security) existed in an environment of a time point at which the image data was collected. Such a determination may be made by the service server 840 or each of the cameras 810.

FIG. 12 shows persons as moving objects. Each person carries a location transmitting device 10 (10A or 10B) which transmits location information. The location transmitting device 10 may be a smart phone, a wearable device, or the like having a built-in GPS device. However, since it is difficult to measure an accurate location inside a building using GPS, it is assumed that an in-building location technology such as a location method employing WiFi is used in a building. Each of a location transmitting device 10A carried by a person on the left side of FIG. 11 and a location transmitting device 10B carried by a person on the right side transmits location information to the service server 840.

The service server 840 may determine whether cameras are currently recording the location transmitting devices 10A and 10B using the location information of the location transmitting devices 10A and 10B and data identification information transmitted by each camera. It is assumed that camera A 810A is currently recording the location transmitting device 10A and camera C 810C is currently recording the location transmitting device 10B. When camera A 810A has a recording direction in which it is not possible to record the location transmitting device 10A, the service server 840 may control the recording direction and the like of camera A 810A. In the case of a surveillance camera, a surveillance point of view may generally be changed using mechanical equipment.

When the location transmitting device 10A and the location transmitting device 10B move near camera B 810B, the service server 840 may control camera B 810B so that camera B 810B records the location transmitting device 10A and/or the location transmitting device 10B.

When the location transmitting device 10A and the location transmitting device 10B enter a recording area of camera B 810B together, camera B 810B may not simultaneously record the location transmitting device 10A and the location transmitting device 10B.

In this case, camera B 810B may continuously record a location of a location transmitting device that first enters the recording area of camera B 810B. Alternatively, when the location transmitting devices have orders of priority, camera B 810B may first record a location of a location transmitting device having a higher order of priority. Alternatively, camera B 810B may alternately record the two location transmitting devices 10A and 10B at predetermined time intervals.

On the assumption that the service server 840 fundamentally has information on fixed locations of the cameras 810, FIG. 12 shows an example in which each of the cameras 810 transmits the time information and the orientation information to the service server 840.

The cameras 810 may analyze audio data acquired using microphones, movement data acquired using motion sensors, temperature data acquired using temperature sensors, or image data, and may transmit event information including data identification information of a time point when an event occurred to the service server 840 when it is determined that the event has occurred.

Needless to say, a user terminal 850 may transfer event information for a request for image data of a specific time point and location to the service server 840. Also, a service requesting server 860 which provides a security service may transfer event information to the service server 840 and receive corresponding event data.

The service server 840 may collect event data using the methods illustrated with reference to FIGS. 6 to 10. Subsequently, the service server 840 may transmit the collected event data or reconstructed event data to the user terminal 850 and the like.

Figure 13:
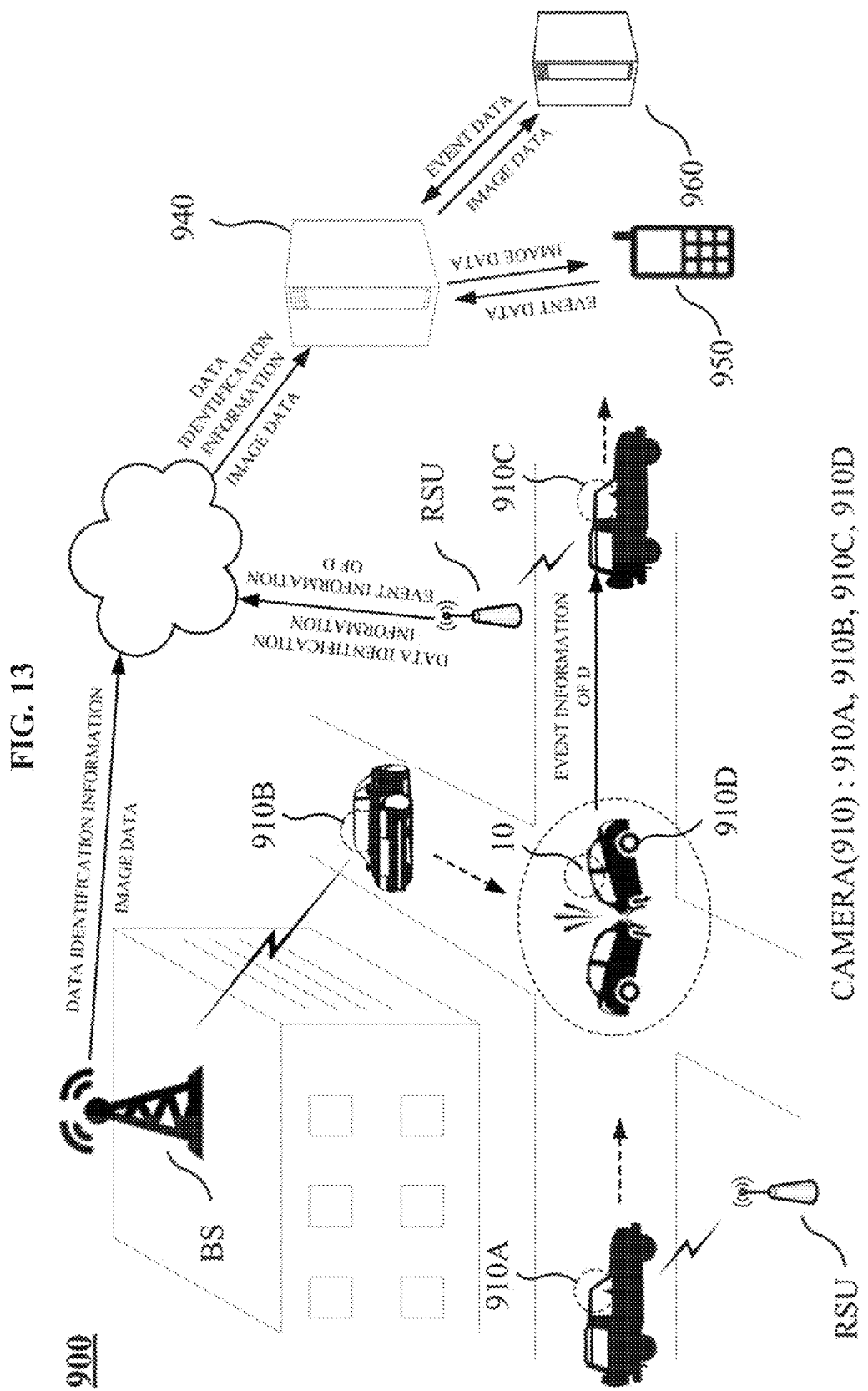
FIG. 13 illustrates an example of a block diagram of a car system which collects image information.

FIG. 13 is an example of a block diagram of a car system 900 which collects image information. FIG. 13 shows a case in which cars including cameras 910 record other cars. Therefore, the cars include both the cameras 910 and location transmitting devices 10. In the car system 900 which collects image information, it is possible to generate and transmit data identification information of image data collected by the cameras 910 in the cars. For convenience of description, it is assumed that the cameras 910 generate and transmit data identification information.

The car system 900 which collects image information includes the cameras 910 (910A, 910B, 910C, and 910D) and a service server 940.

The cameras 910 collect and store image data in storage media, generate data identification information including at least one of time information, location information, orientation information of the cameras, movement speed information, and movement direction information related to the image data, and transmit the data identification information via a wired or wireless network periodically or at specific time points. As described above, in the car system 900 which collects image information, the cameras 910 may collect only images, and other components of the cars may handle generation and transmission of data identification information.

The service server 940 receives data identification information from the plurality of cameras (cars), stores the received data identification information, and receives image data related to an event from a car related to the event on the basis of received event data.

Like in the security system 800 of FIG. 12, the cameras 910 included in the cars may generate data identification information further including at least one of angle-of-views of the cameras, performance information of the cameras, camera setting information of times at which the image data was collected, and illuminance information of the times at which the image data was collected.

The wireless network may be at least one of a mobile communication network and a VANET. Any type of network can be used in a method of collecting event information. However, a car may generally use a VANET or a mobile communication network to transmit data. Needless to say, a network based on another scheme may be used. FIG. 13 shows an example in which the camera 910B transfers information through a base station BS, which is a part of a mobile communication network system, and an example in which cameras 910A and 910C transfer information through road side units (RSUs), which are some components of a VANET.

The cars or the cameras 910 may analyze audio data acquired using microphones, movement data acquired using motion sensors, temperature data acquired using temperature sensors, or the image data, and may transmit event information including data identification information of a time point when an event occurred to the service server 940 when it is determined that the event has occurred.

For example, in FIG. 13, the camera 910B may detect an event in front thereof in which a vehicle has rear-ended another vehicle using the image data, the audio data, or the like, and may transmit event information including location information and time information to the service server 940. Further, when the camera 910D of a car involved in the accident analyzes image data, audio data, vibration data, and the like collected thereby and determines that an accident has occurred, the camera 910D may transmit event information including information on a time and a location at which the accident occurred to the service server 940. The camera 910D may transfer the event information via VANET using a nearby car which includes the camera 910C.

For convenience of description, the cameras 910 has been described as collecting image data and transmitting data through communication modules. However, cars may have hardware communication modules, hardware sensor devices, hardware calculation devices, and the like separate from the cameras 910.

Meanwhile, the location transmitting devices 10 included in the cars transmit their own locations to the service server 940 via the network. In the cars, navigation devices including GPS modules and the like may be used as the location transmitting devices 10.

Operation of the location transmitting devices 10, the cameras 910, and the service server 940 is the same as that of the above-described image information collection methods. A user terminal 950 or a service requesting server 960 may also transmit an image request message to the service server 940. Subsequently, the service server 940 may use the methods described with reference to FIGS. 6 to 10 as a method of collecting event data.

In FIG. 13, the camera 910C is close to an accident spot at a time point when the event which is the vehicle accident occurred, but orientation information does not correspond to the event. Therefore, image data and the like collected by the camera 910C may not be used.

Figure 14:
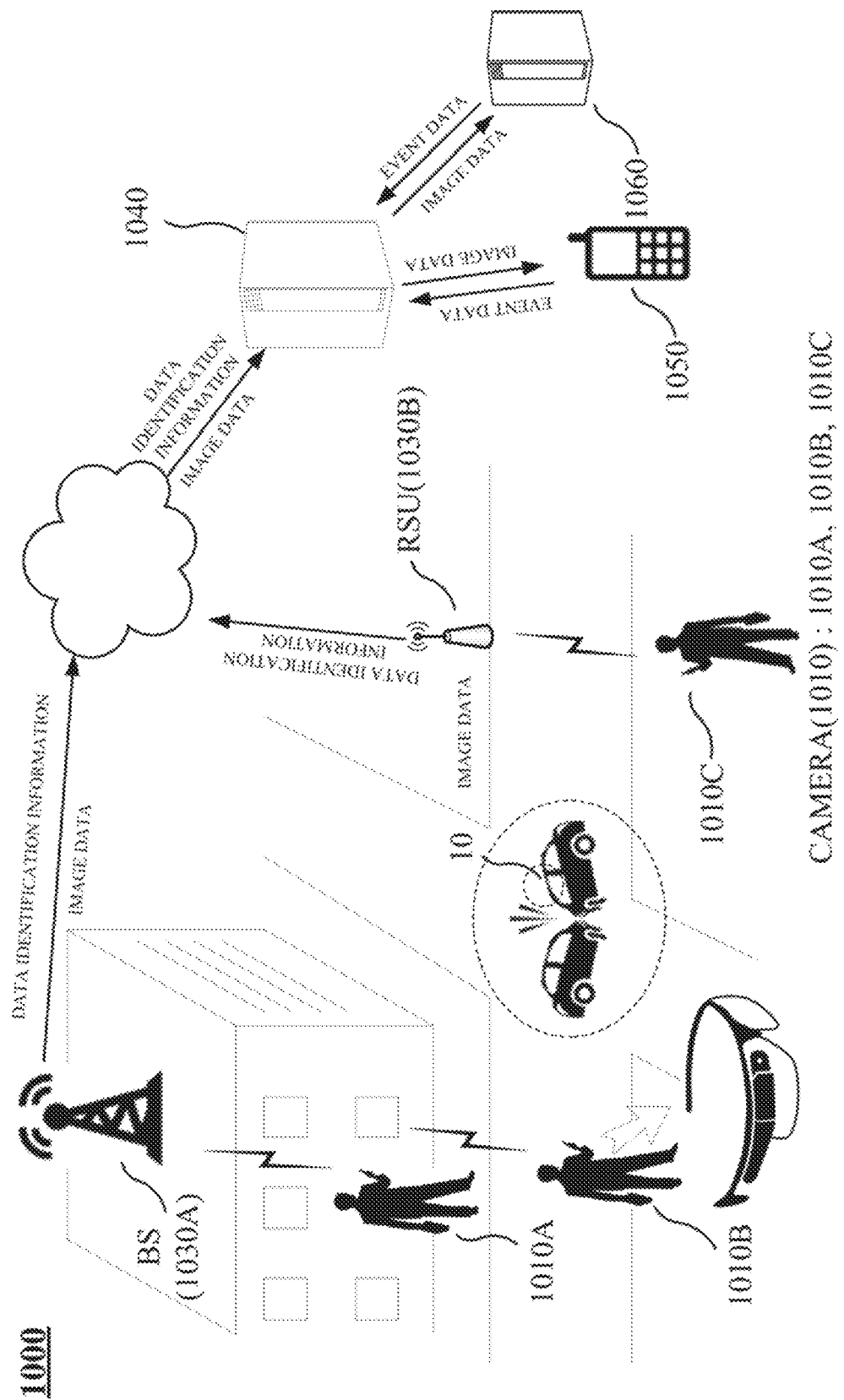
FIG. 14 illustrates an example of a block diagram of a security system employing a wearable device which collects image information.

FIG. 14 is an example of a block diagram of a security system 1000 employing a wearable device which collects image information. The security system 1000 of FIG. 14 is almost the same as the car system 900 of FIG. 13. The security system 1000 of FIG. 14 collects image data using cameras 1010 built in wearable devices worn by persons moving on a street. The wearable devices can generate data identification information of the collected image data and transmit the generated data identification information. However, for convenience of description, it is assumed below that the cameras 1010 generate and transmit data identification information.

The security system 1000 includes a plurality of cameras 1010 (1010A, 1010B, and 1010C) and a service server 1040. The cameras 1010 collect image data and generate data identification information at the same time. Also, as described above, the cameras 1010 may collect only images, and the wearable devices may handle generation and transmission of data identification information.

The cameras 1010 may transmit the data identification information or the image data to the service server 1040 via a mobile communication network using a base station BS. The cameras 1010 may transmit the data identification information or the image data to the service server 1040 through RSUs which constitute a separate dedicated network.

In FIG. 14, a car transmits location information through a location transmitting device 10. In other words, the security system 1000 corresponds to a system that collects image data of recording targets, that is, cars, through the cameras 1010 of the wearable devices. Needless to say, the above-described image data collection method or system may collect image data through other forms of cameras or may collect image data of other recording targets.

Operation of the location transmitting device 10, the cameras 1010A, 1010B, and 1010C, and the service server 1040 is the same as that of the methods described above with reference to FIGS. 6 to 10. A user terminal 1050 or a service requesting server 1060 may also request image data. The service server 1040 transmits collected event data to the service requesting device which has requested image data.

A predetermined access point (AP) exists in the security system 1000 of FIG. 14 depending on a communication method. The base station BS corresponds to an AP of the mobile communication network. Also, the RSUs correspond to APs, relays, or gateway devices of the network. Descriptions will be made below based on the APs. Data collected by a camera is transmitted through an AP used by the camera. An AP becomes a point to which information of a plurality of image information collection devices (cameras) covered by the AP is transferred. Therefore, as described above, APs can be used as management servers 1030 (1030A and 1030B).

The cameras 1010A and 1010B which use the mobile communication network transmit data using the base station. The base station BS can store and manage data identification information transmitted by the cameras 1010A and 1010B. Therefore, the base station BS corresponds to the management server 1030A. Also, an RSU can store and manage data identification information transmitted by the camera 1010C. The RSU also corresponds to the management server 1030B. An image information collection method employing a management server 1030 is the same as that described with reference to FIG. 7.

When there are the plurality of management servers 1030, the service server may transmit an image data request to the plurality of management servers 1030 by broadcasting the image data request. Subsequently, the management servers 1030 transmit related data identification information to the service server 1040 on the basis of information included in the image data request such that the service server 1040 can determine a target camera. Alternatively, the management servers 1030 may directly determine a target camera.

The present embodiment and the attached drawings are merely illustrative to describe a part of the technical spirit included in the above-described technology. Therefore, it is apparent that modifications and specific embodiments which those of ordinary skill in the art can easily infer within the scope of the technical spirit included in the specification and drawings of the above-described technology fall within the scope of the above-described technology.

The invention claimed is:

1. An image information collection system comprising:
a service-requesting device configured to transmit a request message including a target location and a target time;
a plurality of cameras, each camera of the plurality of cameras configured to:
capture and store image data;
generate data identification information including:
a capture time representing when the image data is captured by the camera;
a view orientation of the camera; and
at least one of a location of the camera at the capture time, a movement speed of the camera, a movement direction of the camera, a rotation direction of the camera, a rotation speed of the camera, and a retention period for the image data; and
transmit the data identification information via a network;
and
a service server configured to:
receive the request message from the service-requesting device and the data identification information from the plurality of cameras, and
determine whether a target camera from the plurality of cameras stores image data for the target location at the target time based on the capture time, the view orientation, and a location of the target camera, wherein the location of the target camera has been previously obtained by the service-requesting device or included in the data identification information.

2. The image information collection system of claim 1, further comprising:
a location-transmitting device configured to transmit location information of the location-transmitting device, and
wherein generating the data identification information by a camera from said plurality further comprises generating data representing
distances between the cameras and the location transmitting device.

3. The image information collection system of claim 1, wherein the service server is further configured, when there is no camera storing image data for the target location, to transmit a command to change at least one of the view orientation or a zoom level of a camera that is located near the target location.

4. The image information collection system of claim 1, wherein at least one of the plurality of cameras is disposed within a movable object.

5. The image information collection system of claim 1, wherein the service server is further configured to receive image data for the target location at the target time from the target camera.

6. The image information collection system of claim 1, wherein the service server is configured to determine whether the target camera stores image data for the target location at the target time based on at least one of: availability of the target camera, illumination intensity at a location near the target camera, a capability of the target camera to capture infrared images, a file format of the image data generated by the target camera, and color information of the image data generated by the target camera.

7. An image information collection system comprising:
a plurality of cameras, each camera of the plurality of cameras configured to:
capture and store image data;
generate data identification information including a capture time representing when the image data is captured; a view orientation of the camera; and at least one of a location of the camera at the capture time, a movement-speed of the camera, a movement-direction of the camera, a rotation-direction of the camera, a rotation speed of the camera, and a retention period for the image data and
transmit the data identification information via a network;
and
a service server configured to:
receive a request message that includes a target location and a target time from a service-requesting device;
receive the data identification information from the plurality of cameras;
and
select a target camera from the plurality of cameras based on the capture time, the view orientation and location of the target camera,
wherein the location of the camera either has been previously obtained by the service server or has been included in the data identification information.

8. A method of collecting image data of a moving object, the method comprising:
with a service server via a network, receiving data identification information from each of a plurality of cameras, said data identification information including:
a capture time indicating when image data is captured by such camera;
a view orientation of such camera; and
at least one of a location of such camera at the capture time, a movement speed of such camera, a movement direction of such camera, a rotation direction of such camera, a rotation speed of such camera, and a retention period for the image data;
storing the data identification information;
receiving, by the service server from a service-requesting device, a request message including information identifying a target and a target time;
by the service server, selecting at least one target camera from the plurality of cameras based on the capture time, the view orientation, and a location of the target camera,
said target camera storing image data for the target at the target time;
wherein the location of the target camera either has been previously obtained in the service server or has been included in the data identification information; and
receiving, by the service server, image data for the target at the target time from the target camera;
wherein information identifying the target includes a location of the target or an identifier of the target.

9. The method of claim 8, further comprising:
receiving, by a location transmitting device, a location of the location transmitting device and
wherein the data identification information further includes distances between the cameras and the location transmitting device.

10. The method of claim 8, wherein
said selecting the target camera comprises, when there is no camera storing image data for the target location, transmitting, by the service server, a command to change at least one of the view orientation and a zoom level of a camera located near the target location.

11. The method of claim 8, further comprising:
transmitting, by the service server, the image data from the target camera.

12. An image information collection system comprising:
a plurality of cameras, each of the plurality of cameras configured to:
 capture and store image data in a storage medium;
 generate data identification information that includes a capture time of when the image data is captured; a view orientation, and at least one of: locations of the cameras at the capture time, movement speeds of the cameras, movement directions of the cameras, rotation directions of the cameras, rotation speeds of the cameras, and a retention period for the image data;
 transmit the data identification information via a network;
a management server configured to store the data identification information; and
a service server configured to:
 receive a request message including a target location and a target time from a service requesting device,
 access the data identification information in the management server, and
 determine that a target camera belonging to the plurality of cameras stores image data for the target location at the target time based on the capture time, the orientation of view and location of the camera, wherein the location of the camera was previously obtained by the service server, or included in the data identification.

13. The image information collection system of claim 12, further comprising:
a location-transmitting device configured to transmit location information of the location transmitting device and information on distances between the cameras and the location transmitting device.

14. The image information collection system of claim 12, wherein at least one of the plurality of cameras is disposed within a movable object.

15. The image information collection system of claim 12, wherein the service server is further configured to receive the image data for the target location at the target time from the target camera.

* * * * *